(12) United States Patent
Short

(10) Patent No.: US 12,673,229 B2
(45) Date of Patent: *Jul. 7, 2026

(54) LAYERED ABSORBENT SUBSTRATE INCORPORATING ACTIVATED CARBON AND SUPERABSORBENT MATERIALS

(71) Applicant: Star Liberty LLC, Carlsbad, CA (US)

(72) Inventor: Gregg R. Short, Carlsbad, CA (US)

(73) Assignee: STAR LIBERTY LLC, Carlsbad, CA (US)

( * ) Notice: Subject to any disclaimer, the term of this patent is extended or adjusted under 35 U.S.C. 154(b) by 767 days.

This patent is subject to a terminal disclaimer.

(21) Appl. No.: 17/897,782

(22) Filed: Aug. 29, 2022

(65) Prior Publication Data

US 2022/0410231 A1    Dec. 29, 2022

Related U.S. Application Data

(63) Continuation-in-part of application No. 17/714,711, filed on Apr. 6, 2022, which is a continuation-in-part of application No. 16/367,629, filed on Mar. 28, 2019, now Pat. No. 11,344,933.

(60) Provisional application No. 62/712,620, filed on Jul. 31, 2018, provisional application No. 62/684,392, filed on Jun. 13, 2018.

(51) Int. Cl.
| | |
|---|---|
| *A62D 3/33* | (2007.01) |
| *B01J 20/20* | (2006.01) |
| *B01J 20/28* | (2006.01) |
| *B09B 101/65* | (2022.01) |
| *G21F 9/12* | (2006.01) |

(52) U.S. Cl.
CPC ................ *A62D 3/33* (2013.01); *B01J 20/20* (2013.01); *B01J 20/28016* (2013.01); *B01J 20/28023* (2013.01); *G21F 9/12* (2013.01); *B01J 2220/68* (2013.01); *B09B 2101/65* (2022.01)

(58) Field of Classification Search
None
See application file for complete search history.

(56) References Cited

U.S. PATENT DOCUMENTS

| | | | |
|---|---|---|---|
| 2004/0237790 A1 | 12/2004 | von Blucher | |
| 2008/0058736 A1* | 3/2008 | Reshamwala | A61B 50/36 |
| | | | 604/319 |

(Continued)

OTHER PUBLICATIONS

Sata, et al. "Development and Evaluation of the Preparation Work Sheet with Anticancer Drug Adsorption Characteristics", Jpn J. Pharm Health Care Sci., vol. 42, No. 5, pp. 317-327, 2016.

(Continued)

*Primary Examiner* — Arti Singh-Pandey
(74) *Attorney, Agent, or Firm* — Thomas | Horstemeyer LLP

(57) ABSTRACT

Various examples of waste disposal substrates are disclosed. The waste disposal substrates include (a) at least one layer of fibers, (b) at least one layer containing activated carbon; and (c) at least one layer containing superabsorbent particles. The substrate can absorb liquid radioactive medical waste to facilitate safe disposal of liquid radioactive medical waste. The liquid radioactive medical waste, or a component of the liquid radioactive medical waste, can be collected, dissolved, adsorbed, inactivated, destroyed, and/or disposed of within the waste disposal substrate.

18 Claims, 7 Drawing Sheets

(56) References Cited

U.S. PATENT DOCUMENTS

| | | |
|---|---|---|
| 2012/0024724 A1 | 2/2012 | Beardsall et al. |
| 2013/0085312 A1 | 4/2013 | Fowler et al. |
| 2015/0231433 A1 | 8/2015 | Short |
| 2017/0252502 A1 | 9/2017 | Ward |
| 2022/0249894 A1* | 8/2022 | Short ....................... B01J 20/26 |

OTHER PUBLICATIONS

PCT/US2019/024535 International Search Report and Written Opinion, May 24, 2019.

* cited by examiner

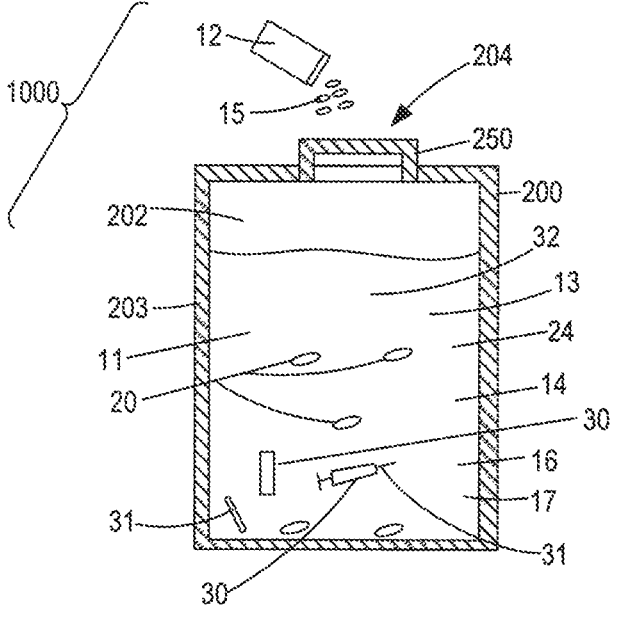
FIG. 11A
FIG. 11B
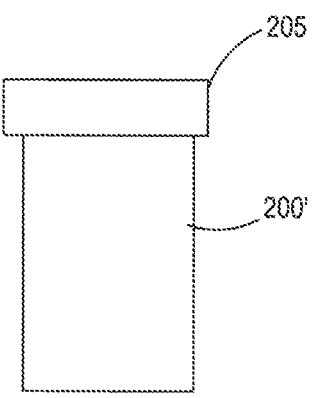
FIG. 12

LAYERED ABSORBENT SUBSTRATE INCORPORATING ACTIVATED CARBON AND SUPERABSORBENT MATERIALS

CROSS-REFERENCE TO RELATED APPLICATIONS

This patent application is (i) a continuation-in-part patent application of U.S. Utility patent application Ser. No. 17/714,711 filed on Apr. 6, 2022 and entitled "KITS AND KIT COMPONENTS AND METHODS OF USING KITS AND KIT COMPONENTS TO DISPOSE OF LIQUID PHARMACEUTICALS AND DISSOLVED SOLID PHARMACEUTICALS, REGULATED WASTES, AND OTHER NON-REGULATED WASTES," which is (ii) a continuation-in-part patent application of U.S. Utility patent application Ser. No. 16/367,629 filed on Mar. 28, 2019 and entitled "KITS AND METHODS FOR DISPOSING OF LIQUID PHARMACEUTICALS AND DISSOLVED SOLID PHARMACEUTICALS," now U.S. Pat. No. 11,344,933, which claims the benefit of priority to (iii) U.S. Provisional Patent Application Ser. No. 62/684,392 filed on Jun. 13, 2018 and entitled "KITS AND METHODS FOR DISPOSING OF LIQUID PHARMACEUTICALS AND DISSOLVED SOLID PHARMACEUTICALS," and (iv) U.S. Provisional Patent Application Ser. No. 62/712,620 filed on Jul. 31, 2018 and entitled "KITS AND METHODS FOR DISPOSING OF LIQUID PHARMACEUTICALS AND DISSOLVED SOLID PHARMACEUTICALS," the subject matter of each of which is hereby incorporated by reference in their entirety.

FIELD OF THE INVENTION

The present invention relates generally to methods of disposing of liquid wastes such as liquid radioactive medical waste. The present invention further relates to waste disposal kits that may be used in the disclosed methods of disposing of liquid wastes such as liquid radioactive medical waste.

The present invention further generally relates to kit components suitable for use in the herein-described waste disposal kits, and variations thereof, that may be used in a number of methods other than in methods of disposing of liquid radioactive medical waste.

BACKGROUND OF THE INVENTION

Methods of disposing of solid and liquid waste, including solid pharmaceuticals and liquid pharmaceuticals, such as in a home, medical or hospital environment, typically comprise disposing of the pharmaceuticals in a waste basket with or without any packaging, squirting into a sink or in a waste container, flushing down toilet, etc. Such conventional methods of disposing of solid and liquid wastes create an unsafe, environmentally unfriendly, distribution of discarded solid and liquid waste including solid and liquid pharmaceuticals.

Moreover, conventional methods of disposing of liquid radioactive medical waste also create an unsafe, environmentally unfriendly, distribution of discarded, radioactive medical waste. Conventional methods of disposing of liquid radioactive medical waste depend on the half-life of the radioactive medical waste, but typically may comprise either (1) diluting the liquid radioactive medical waste with water, and disposing of the diluted liquid radioactive medical waste in a municipal sewer system, or (2) collecting the liquid radioactive medical waste in a lead-lined container for storage until disposal via a radioactive medical waste disposal service.

There is a need in the art for simple, effective, safe, and environmentally friendly waste disposal kits, as well as methods of disposing of liquid and dissolved waste including solid pharmaceuticals and liquid pharmaceuticals, and liquid radioactive medical waste.

SUMMARY OF THE INVENTION

The present invention is directed to simple, effective, safe, and environmentally friendly methods of disposing of liquid wastes such as solid pharmaceuticals and liquid pharmaceuticals, and liquid radioactive medical waste. The disclosed methods of disposing of liquid radioactive medical waste efficiently and safely enable proper disposal of the liquid radioactive medical waste. The disclosed waste disposal systems provide a cost-effective and convenient method of properly disposing of liquid radioactive medical waste.

In the broadest sense, the present invention involves compositions, devices, kits, and methods for collecting, dissolving, adsorbing, inactivating, destroying, and/or disposing of liquid wastes such as liquid radioactive medical waste.

In one exemplary embodiment, the method of disposing of liquid radioactive medical waste comprises depositing liquid radioactive medical waste into or onto a substrate comprising (a)(i) fibers, (ii) foam, or (iii) both fibers and foam, and (b) activated carbon. The step of depositing liquid radioactive medical waste into or onto the substrate may comprise, for example, using a syringe to input liquid radioactive medical waste into or onto the substrate.

In another exemplary embodiment, the method of disposing of liquid radioactive medical waste comprises depositing liquid radioactive medical waste into or onto a substrate comprising (a)(i) fibers, (ii) foam, or (iii) both fibers and foam, and (b) activated carbon, the substrate being proximate to, on, or within a container.

The present invention is also directed to waste disposal kits. In one exemplary embodiment, the waste disposal kit comprises a substrate comprising (a)(i) fibers, (ii) foam, or (iii) both fibers and foam, and (b) activated carbon. The step of depositing liquid radioactive medical waste into or onto the substrate may comprise, for example, using a syringe to input liquid radioactive medical waste into or onto the substrate.

The present invention is further directed to methods of disposing of liquid radioactive medical waste. In one exemplary embodiment, the method of disposing of liquid radioactive medical waste comprises: depositing liquid radioactive medical waste within and/or on a substrate comprising (a)(i) fibers, (ii) foam, or (iii) both fibers and foam, and (b) activated carbon, the substrate being proximate to, on, or within a container; and depositing liquid radioactive medical waste into the container. In some embodiments, the substrate further comprises a color change "stripe" that undergoes a color change when combined with the effective amount of liquid. For example, the "stripe" would undergo a color change when combined with an effective amount of liquid radioactive medical waste.

The present invention is further directed to other waste disposal kits. In one embodiment, the waste disposal kit comprises: a substrate comprising (a)(i) fibers, (ii) foam (not shown), or (iii) both fibers and foam, and (b) activated carbon; and (c) a container comprising: a container housing surrounding a container volume, a container opening providing access to the container volume from outside the container housing, and a movable container housing closure member sized to extend over and cover the container opening, wherein the substrate is proximate, on or within the container. Exemplary containers include, but are not limited to, a plastic jug, a pill bottle, etc.

In other embodiments, the waste disposal kit comprises: (I) a container comprising: a container housing surrounding a container volume, a container opening providing access to the container volume from outside the container housing, and a movable container housing closure member sized to extend over and cover the container opening; and (II) a mixture within container, the mixture comprising: (i) water occupying at least a portion of the container volume, (ii) activated carbon, (iii) a first monomeric component capable of polymerization when combined with an effective amount of a polymerization initiator, and (iv) an optional colorant that causes the mixture to undergo a color change upon polymerization of the first monomeric component.

The present invention is further directed to other method of disposing of liquid radioactive medical waste. In one embodiment, the method of disposing of liquid radioactive medical waste comprises a method of disposing of liquid radioactive medical waste, wherein the method comprises: partially filling a pill bottle containing discardable (i.e., unused or expired) liquid radioactive medical waste; and pouring/placing a solidifying composition into the pill bottle, the solidifying composition comprising (a) activated carbon and (b)(i) a gelling agent (not shown), (ii) superabsorbent particles, (iii) a polymerizable composition comprising a first monomeric component that is capable of polymerization when combined with an effective amount of a polymerization initiator, or (iv) any combination of (i), (ii), and (iii).

In other embodiments, the method of disposing of liquid radioactive medical waste comprises: depositing liquid radioactive medical waste into a container containing (i) a first monomeric component, (ii) activated carbon and (iii) water, the first monomeric component being capable of polymerization when combined with an effective amount of a polymerization initiator. In some embodiments, the container may further contain a colorant that causes the mixture within the container to undergo a color change upon polymerization of the first monomeric component The present invention is further directed to liquid radioactive medical waste disposal kits. In one embodiment, the liquid radioactive medical waste disposal kit comprises: (I) a container comprising: a container housing surrounding a container volume, a container opening providing access to the container volume from outside the container housing, and a movable container housing closure member sized to extend over and cover the container opening; and (II) a mixture within the container, the mixture comprising: (i) water occupying at least a portion of the container volume, (ii) activated carbon, (iii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is further directed to method of disposing of pharmaceutical and/or sharps. In one embodiment, the method of disposing of pharmaceutical and/or sharps comprises: depositing one or more pharmaceuticals, one or more syringes, one or more needles, one or more of the herein-described substrates comprising activated carbon, or any combination thereof into a container containing a mixture of: (i) water and (ii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is even further directed to other liquid radioactive medical waste disposal kits comprising: a solidifying composition, the solidifying composition comprising activated carbon and (i) a gelling agent (not shown), (ii) superabsorbent particles, (iii) a first monomeric component that is capable of polymerization when combined with an effective amount of a polymerization initiator, (iv) an optional colorant, the colorant enabling the mixture to undergo a color change when combined with the effective amount of the polymerization initiator, or (v) any combination of (i), (ii), (iii) and (iv).

The present invention is even further directed to the above-described substrates, as well as methods of using the above-described substrates in methods other than in waste disposal kits. In one embodiment, the substrate, referred to herein as "a waste disposal substrate," comprises: (a) at least one layer of fibers, (b) at least one layer comprising activated carbon; and (c) at least one layer comprising superabsorbent particles.

The present invention is yet further directed to methods of using waste disposal substrates. In one embodiment, the method of using a waste disposal substrate comprises contacting a waste disposal substrate with a liquid fluid, for example, liquid radioactive medical waste, wherein the waste disposal substrate comprising: (a) at least one layer of fibers, (b) at least one layer comprising activated carbon; and (c) at least one layer comprising superabsorbent particles, wherein the liquid fluid, or a component therein, is collected, dissolved, adsorbed, inactivated, destroyed, and/or disposed of within the waste disposal substrate. In some embodiments, the contacting step may comprise bringing the waste disposal substrate into contact with the liquid fluid (e.g., liquid radioactive medical waste), such as when using the waste disposal substrate as a wipe (e.g., a wiping structure having a size and shape similar to a paper towel). In other embodiments, the contacting step may comprise bringing the liquid fluid (e.g., liquid radioactive medical waste) into contact with the waste disposal substrate, such as the introduction of a waste liquid fluid onto and into the waste disposal substrate.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

5

6

Figure 5:
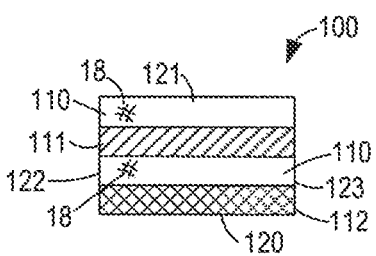
Figure 6:
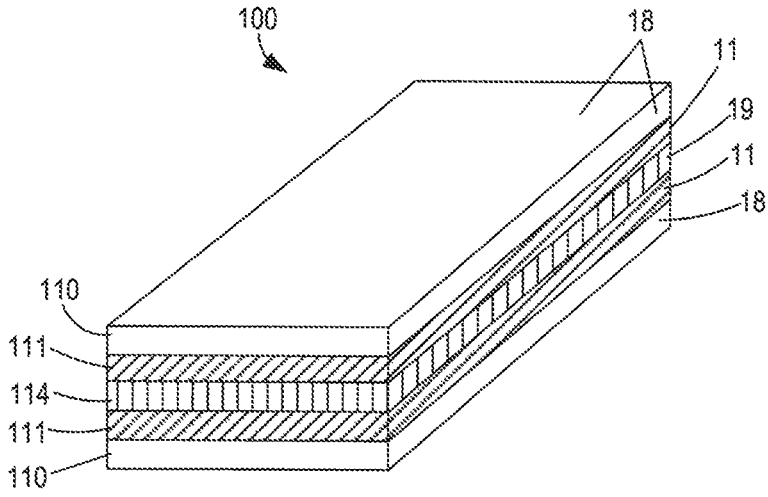
Figure 7:
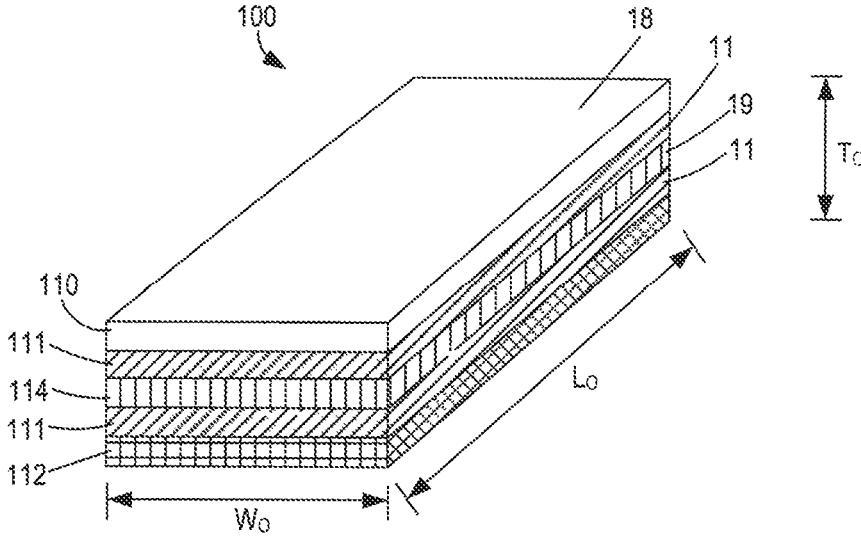
Figure 7A:
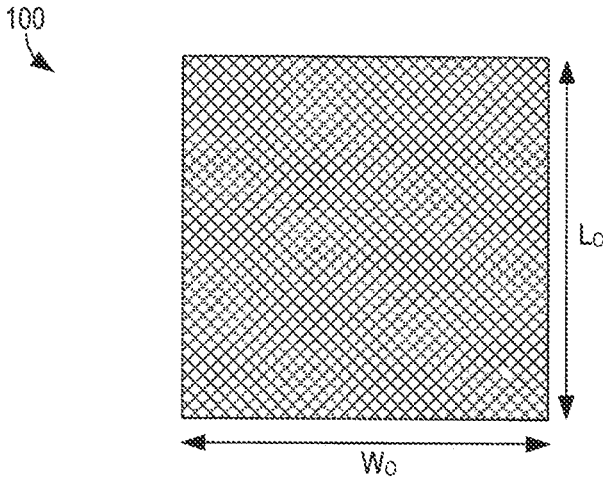
Figure 7B:
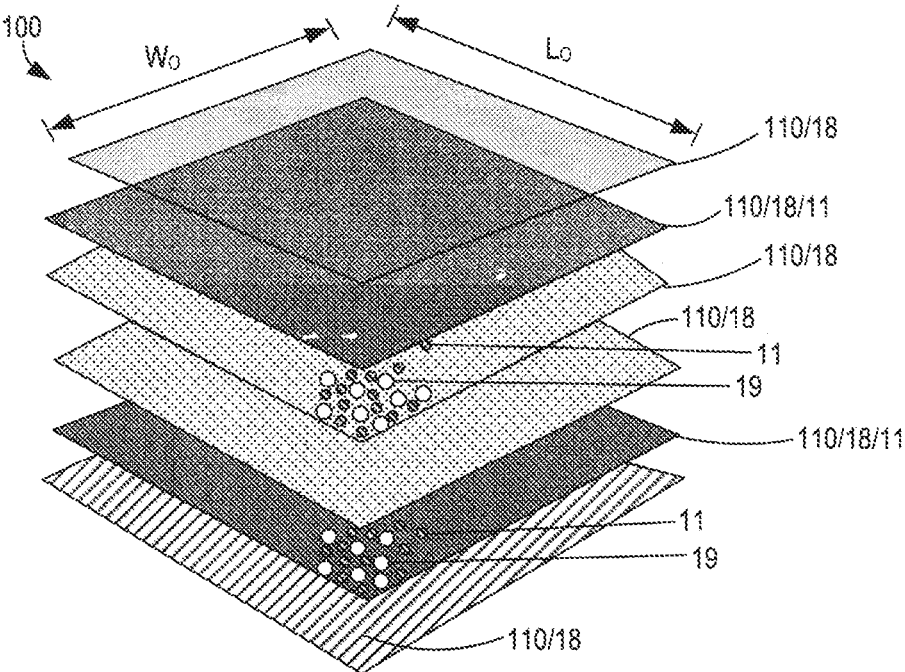
Figure 8A:
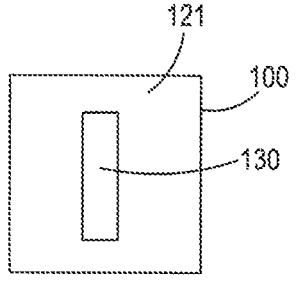
Figure 8B:
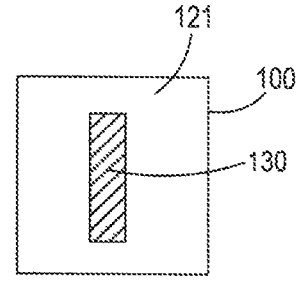
Figure 9A:
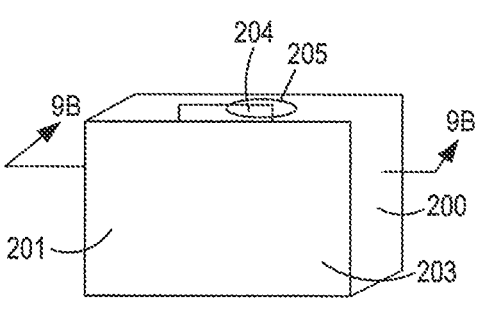
Figure 9B:
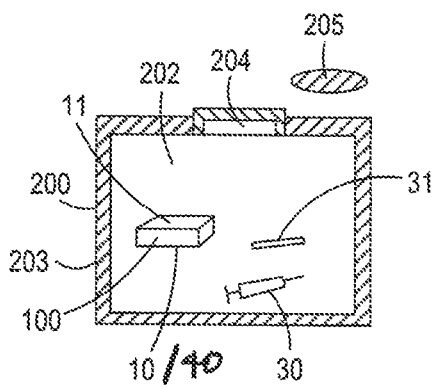
Figure 10:
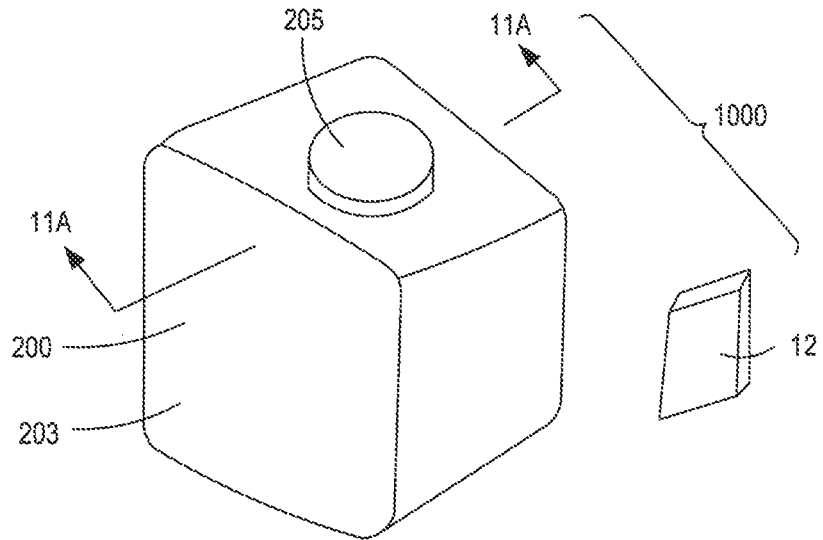

FIG. 5 depicts a side view of another exemplary substrate suitable for use in waste disposal kits of the present invention;

FIG. 6 depicts a perspective view of another exemplary substrate suitable for use in waste disposal kits of the present invention;

FIG. 7 depicts a perspective view of another exemplary substrate suitable for use in waste disposal kits of the present invention;

FIGS. 7A-7D depict top and detailed views of other exemplary substrates of the present invention;

FIGS. 8A and 8B depict top views of another exemplary substrate with a color change stripe thereon, with one color change stripe having no color (FIG. 8A) and the other color change stripe having a visible color (FIG. 8B) after effective amount of liquid is added to the substrate;

FIG. 9A depicts an exemplary container suitable for use in waste disposal kits of the present invention;

FIG. 9B depicts a cross-sectional view of the exemplary container shown in FIG. 9A as viewed along line 9B-9B shown in FIG. 9A;

FIG. 10 depicts a perspective view of another exemplary waste and/or sharps disposal kit of the present invention;

FIG. 11A depicts a cross-sectional view of the exemplary container shown in the exemplary waste and/or sharps disposal kit of FIG. 10 as view along line 11A-11A shown in FIG. 10;

FIG. 11B depicts a bottom view of an exemplary container housing closure member for use with the exemplary container shown in FIGS. 10-11A; and FIG. 12 depicts a perspective view of another exemplary container for use in the waste disposal kits of the present invention.

DETAILED DESCRIPTION OF THE INVENTION

The present invention is directed to methods of disposing of waste, including liquid radioactive medical waste, such as liquid radioactive medical waste generated by radioisotope research, nuclear medicine, radiation oncology, and/or positron emission tomography (PET). The present invention is further directed to waste disposal kits such as liquid radioactive medical waste disposal kits.

I. Methods of Disposing of Waste

The present invention is directed to methods of disposing of liquid pharmaceuticals and dissolved solid pharmaceuticals 20, and liquid radioactive medical waste 40. FIGS. 1-12 depict exemplary waste disposal kit components such as substrate 100 that may be used in the methods of the present invention.

As discussed above, the method of disposing of liquid pharmaceuticals and dissolved solid pharmaceuticals 20, and liquid radioactive medical waste 40 may comprise disposing of one or more liquid pharmaceuticals and/or dissolved solid pharmaceuticals 20 and/or liquid radioactive medical waste 40 into and/or onto a substrate 100. The substrate 100 may have any number of possible configurations such as those shown in FIGS. 1-8B. It should be understood that substrate 100 may comprise any number of layers of materials, combinations of materials, and layer configurations, such as those described herein, so as to dispose of liquid pharmaceuticals and dissolved solid pharmaceuticals 20, and liquid radioactive medical waste 40.

II. Waste Disposal Kits

The present invention is also directed to waste disposal kits for use in a professional setting and/or a home setting.

FIGS. 1-12 depict exemplary waste disposal components such as substrate 100 and container 200 that may be used in the waste disposal kits of the present invention.

III. Waste Disposal Substrates and Methods of Using the Same

The present invention is even further directed to waste disposal substrates comprises: (a) at least one layer of fibers, (b) at least one layer comprising activated carbon; and (c) at least one layer comprising superabsorbent particles.

The present invention is yet further directed to methods of using waste disposal substrates. In one embodiment, the method of using a waste disposal substrate comprises contacting a waste disposal substrate with a liquid fluid, such as liquid radioactive medical waste 40, wherein the waste disposal substrate comprising: (a) at least one layer of fibers, (b) at least one layer comprising activated carbon; and (c) at least one layer comprising superabsorbent particles, wherein the liquid fluid (e.g., liquid radioactive medical waste 40), or a component therein, is collected, dissolved, adsorbed, inactivated, destroyed, and/or disposed of within the waste disposal substrate. In some embodiments, the contacting step may comprise bringing the waste disposal substrate into contact with the liquid fluid (e.g., liquid radioactive medical waste 40), such as when using the waste disposal substrate as a wipe (e.g., a wiping structure having a size and shape similar to a paper towel). In other embodiments, the contacting step may comprise bringing the liquid fluid (e.g., liquid radioactive medical waste 40) into contact with the waste disposal substrate, such as the introduction of a waste liquid fluid (e.g., liquid radioactive medical waste 40) onto and into the waste disposal substrate.

The present invention will be further described in the following additional embodiments, examples, and claims.

Additional Embodiments

Methods of Disposing of Liquid Pharmaceuticals and/or Liquid Radioactive Medical Waste 1. A method of disposing of liquid pharmaceuticals 10 (or dissolved solid pharmaceuticals 20 in, e.g., water)(or liquid radioactive medical waste 40), said method comprising: depositing one or more liquid pharmaceuticals 10 into or onto a substrate 100 comprising (a)(i) fibers 18, (ii) foam (not shown), or (iii) both fibers 18 and foam, and (b) activated carbon 11. As used in these additional embodiments, the term "liquid pharmaceuticals" is used to encompass liquid pharmaceuticals, as well as solid pharmaceuticals 20 that have been dissolved in a solvent such as water. In addition, the activated carbon mentioned throughout the present description may be any commercially available activated carbon. Suitable activated carbon includes, but is not limited to, activated carbon commercially available from General Carbon Corporation (Paterson, N.J.); Parchem Fine & Specialty Chemicals (New Rochelle, N.Y.), or any other activated carbon supplier. Typically, the activated carbon is present as a fine powder or particles. Activated carbon in the form of fibers may also be present. Further, "liquid radioactive medical waste" is used to encompass all liquid radioactive medical waste 40 including, but not limited to, liquid radioactive medical waste 40 generated by radioisotope research, nuclear medicine, radiation oncology, and/or positron emission tomography (PET).

2. The method of embodiment 1, wherein the substrate 100 comprises fibers 18.

3. The method of embodiment 1 or 2, wherein the substrate 100 comprises at least one fiber-containing layer

US 12,673,229 B2

7

110. See, for example, FIG. 1, which shows a single layer 110 with activated carbon 11 disbursed throughout the single layer 110.

4. The method of any one of embodiments 1 to 3, wherein the substrate 100 comprises two or more fiber-containing layers 110. See, for example, FIG. 3, which shows two layers 110 with a layer of activated carbon 111 positioned between the two layers 110. It should be understood that, in other embodiments, two layers of activated carbon 111 may be positioned on opposite sides of a single layer 110 of fiber 18, foam or both.

5. The method of any one of embodiments 1 to 4, wherein the substrate 100 comprises one or more nonwoven layers 110, one or more paper layers 110, one or more woven layers 110, one or more knit layers 110, or any combination thereof.

6. The method of any one of embodiments 1 to 5, wherein the substrate 100 comprises one or more nonwoven layers 110.

7. The method of any one of embodiments 1 to 6, wherein the substrate 100 comprises foam (not shown).

8. The method of any one of embodiments 1 to 7, wherein the substrate 100 comprises at least one foam-containing layer 110. See again, for example, FIG. 1, which shows a single layer 110 with activated carbon 11 disbursed throughout the single layer 110.

9. The method of any one of embodiments 1 to 8, wherein the substrate 100 comprises two or more foam-containing layers 110.

10. The method of any one of embodiments 1 to 9, wherein the substrate 100 comprises an outermost fiber-containing layer 110.

11. The method of any one of embodiments 1 to 10, wherein the substrate 100 comprises an outermost foam-containing layer 110.

12. The method of any one of embodiments 1 to 10, wherein the substrate 100 comprises an outermost non-penetrable layer 112 (e.g., one that a needle cannot push thru such as a hard plastic layer, a film layer, an epoxy layer, a metal layer, etc.). See, for example, substrate 100 shown in FIGS. 3, 5 and 7. Suitable outermost non-penetrable film layers 112 include, but are not limited to, liquid impermeable polyethylene film, liquid impermeable polypropylene film, etc.

13. The method of any one of embodiments 1 to 12, wherein the activated carbon 11 is present as a layer of activated carbon 111. See, for example, substrate 100 shown in FIGS. 2-7.

14. The method of any one of embodiments 1 to 13, wherein the activated carbon 11 is present as a layer of activated carbon 111 extending along an outer surface 120 of the substrate 100. See, for example, substrate 100 shown in FIGS. 2 and 4.

15. The method of any one of embodiments 1 to 14, wherein the activated carbon 11 is present as a layer of activated carbon 111 extending within the substrate 100 and positioned a distance from opposite major outer surfaces 120/121 of the substrate 100. See, for example, substrate 100 shown in FIGS. 3-5.

16. The method of any one of embodiments 1 to 15, wherein the activated carbon 11 is present as two or more layers of activated carbon 111. See, for example, substrate 100 shown in FIG. 4.

17. The method of any one of embodiments 1 to 16, wherein the activated carbon 11 is present within two or more layers 110/111/112 of the substrate 100.

18. The method of any one of embodiments 1 to 17, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

19. The method of any one of embodiments 1 to 18, wherein the activated carbon 11 is not present within at least one layer 110/112 of the substrate 100.

20. The method of any one of embodiments 1 to 19, wherein the substrate 100 further comprises (c) (i) a gelling agent (not shown), (ii) superabsorbent particles 19, or (iii) both a gelling agent and superabsorbent particles 19. See, for example, substrate 100 shown in FIGS. 3 and 6-7. Suitable gelling agents include, but are not limited to, acacia, alginic acid, bentonite, carbomers, carboxymethyl cellulose, ethylcellulose, gelatin, hydroxyethyl cellulose, hydroxypropyl cellulose, magnesium aluminum silicate, methylcellulose, poloxamers, polyvinyl alcohol, sodium alginate, tragacanth, and xanthan gum. Suitable superabsorbent particles 19 include, but are not limited to, superabsorbent particles used in diapers. See, for example, superabsorbent particles described in U.S. Pat. No. 4,076,663 issued Feb. 28, 1978 to Masuda et al.; U.S. Pat. No. 4,286,082 issued Aug. 25, 1981 to Tsubakimoto et al.; U.S. Pat. No. 4,062,817 issued Dec. 13, 1977 to Westerman; U.S. Pat. No. 4,340,706 issued Jul. 20, 1982 to Obayashi et al.; and U.S. Pat. No. 6,646,179 issued Nov. 11, 2003 to Melius et al. Suitable commercially available superabsorbent materials include, but are not limited to, superabsorbent materials available from Evonik Industries (Greensboro, N.C.) and Dow Chemical (Midland, Mich.).

21. The method of embodiment 20, wherein the gelling agent is present as a layer of gelling agent 114.

22. The method of embodiment 20 or 21, wherein the gelling agent is present as a layer of gelling agent 114 extending along an outer surface 120/121/122/123 of the substrate 100.

23. The method of any one of embodiments 20 to 22, wherein the gelling agent is present as a layer of gelling agent 114 extending within the substrate 100 and positioned a distance from opposite major outer surfaces 120/121 of the substrate 100.

24. The method of any one of embodiments 20 to 23, wherein the gelling agent is present as two or more layers of gelling agent 114.

25. The method of any one of embodiments 20 to 24, wherein the gelling agent is present within two or more layers 110/111/112/114 of the substrate 100.

26. The method of any one of embodiments 20 to 25, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

27. The method of any one of embodiments 20 to 26, wherein the gelling agent extends along one or more outer surfaces 120/121/122/123 of the substrate 100. See, outer surfaces 120/121/122/123 of substrate 100 shown in FIG. 5.

28. The method of any one of embodiments 20 to 27, wherein the gelling agent extends along all outer surfaces 120/122/123 of the substrate 100 except an upper surface 121.

29. The method of any one of embodiments 20 to 28, wherein the superabsorbent particles 19 are present as a layer of superabsorbent particles 114. See, for example, substrate 100 shown in FIGS. 3 and 6-7.

30. The method of any one of embodiments 20 to 29, wherein the superabsorbent particles 19 are present as a layer of superabsorbent particles 114 extending along an outer surface 120/121/122/123 of the substrate 100.

31. The method of any one of embodiments 20 to 30, wherein the superabsorbent particles 19 are present as a layer of superabsorbent particles 114 extending within the substrate 100 and positioned a distance from opposite major outer surfaces 120/121 of the substrate 100. See again, for example, substrate 100 shown in FIGS. 6-7.

32. The method of any one of embodiments 20 to 31, wherein the superabsorbent particles 19 are present as two or more layers 114 of superabsorbent particles.

33. The method of any one of embodiments 20 to 32, wherein the superabsorbent particles 19 are present within two or more layers 110/111/112/114 of the substrate 100.

34. The method of any one of embodiments 20 to 33, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

35. The method of any one of embodiments 20 to 34, wherein the superabsorbent particles 19 extend along one or more outer surfaces 120/121/122/123 of the substrate 100.

36. The method of any one of embodiments 20 to 35, wherein the superabsorbent particles 19 extend along all outer surfaces 120/122/123 of the substrate 100 except an upper surface 121.

37. The method of any one of embodiments 20, 29 and 31, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

38. The method of embodiment 37, wherein the two layers of the activated carbon are positioned along opposite sides of the layer of superabsorbent particles. It should be understood that the two layers of the activated carbon may be positioned (1) along opposite sides of and adjacent to the layer of superabsorbent particles, or (2) along opposite sides of but not adjacent to the layer of superabsorbent particles.

39. The method of embodiment 38 or 39, wherein the two layers of the activated carbon and the layer of superabsorbent particles are bonded to one another with the layer of superabsorbent particles being sandwiched between the two layers of the activated carbon.

40. The method of any one of embodiments 37 to 39, wherein the substrate comprises two outermost fiber-containing layers with one outermost fiber-containing layer being positioned along opposite major outer surfaces of the substrate.

41. The method of embodiment 40, wherein each of the two outermost fiber-containing layers comprises a nonwoven layer.

42. The method of any one of embodiments 37 to 39, wherein the substrate comprises an outermost non-penetrable layer positioned along an opposite major outer surface from said outermost fiber-containing layer of the substrate. See, for example, substrate 100 shown in FIG. 6.

43. The method of embodiment 42, wherein (i) the outermost non-penetrable layer comprises a film layer, and (ii) the outermost fiber-containing layer comprises a nonwoven layer. See, for example, substrate 100 shown in FIG. 7.

44. The method of any one of embodiments 1 to 43, wherein the substrate 100 comprises from two to eight fiber-containing layers 110.

45. The method of any one of embodiments 1 to 44, wherein the substrate 100 comprises from two to eight nonwoven layers 110.

46. The method of any one of embodiments 6 to 45, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 grams per square meter (gsm) to about 180.0 gsm. It should be understood that each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

47. The method of any one of embodiments 6 to 46, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

48. The method of any one of embodiments 1 to 47, wherein the substrate 100 comprises from two to six layers containing activated carbon 111.

49. The method of any one of embodiments 1 to 48, wherein the substrate 100 comprises four layers containing activated carbon 111. See, for example, substrate 100 shown in FIGS. 7A-7D.

50. The method of any one of embodiments 1 to 49, wherein the substrate 100 comprises (i) at least one layer containing activated carbon 111 in combination with fibers, and (ii) at least one layer containing activated carbon 111 but no fibers.

51. The method of any one of embodiments 1 to 50, wherein the substrate 100 comprises (i) at least two layers containing activated carbon 111 in combination with fibers, and (ii) at least two layers containing activated carbon 111 but no fibers.

52. The method of any one of embodiments 1 to 51, wherein the substrate 100 comprises from two to six layers containing superabsorbent particles 114.

53. The method of any one of embodiments 1 to 52, wherein the substrate 100 comprises from two to three layers containing superabsorbent particles 114. See again, for example, substrate 100 shown in FIGS. 7A-7D.

54. The method of any one of embodiments 20 to 53, wherein the substrate 100 comprises at least one layer containing a mixture of activated carbon 11 and superabsorbent particles 19. See again, for example, substrate 100 shown in FIGS. 7A-7D.

55. The method of any one of embodiments 20 to 54, wherein the substrate 100 comprises at least two layers containing a mixture of activated carbon 11 and superabsorbent particles 19. See again, for example, substrate 100 shown in FIGS. 7A-7D.

56. The method of any one of embodiments 20 to 55, wherein the substrate 100 comprises at least one layer comprising (or consisting of) superabsorbent particles 19. See, for example, substrate 100 shown in FIGS. 7C-7D.

57. The method of any one of embodiments 20 to 56, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

58. The method of any one of embodiments 20 to 57, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

59. The method of any one of embodiments 20 to 58, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

60. The method of any one of embodiments 20 to 59, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

Figure 7C:
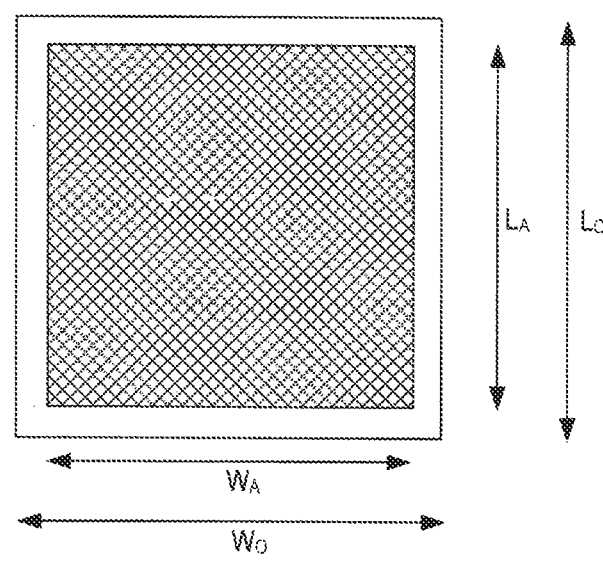
Figure 7D:
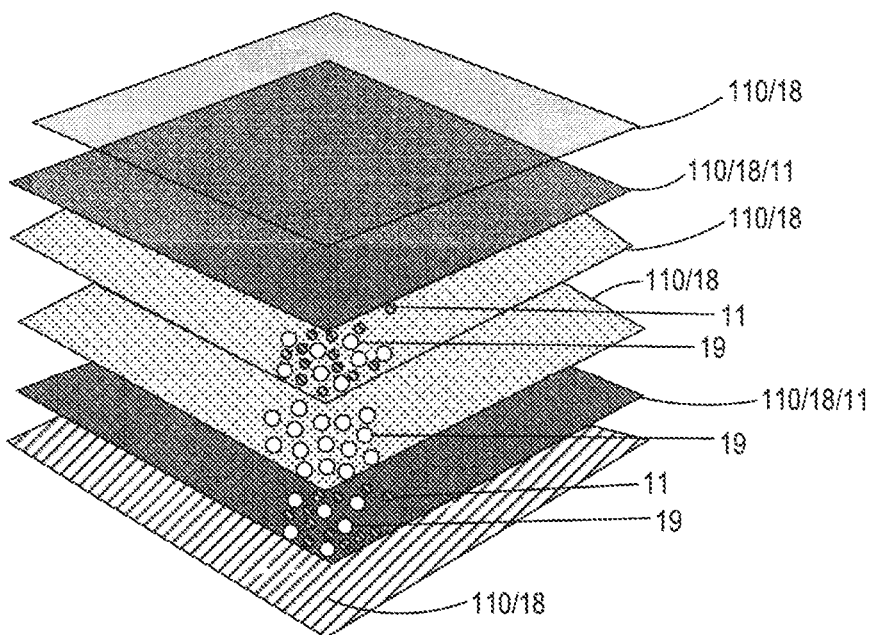

61. The method of any one of embodiments 1 to 60, wherein the substrate 100 has an overall length $L_O$ ranging from about 3.0 inches (in) to about 48.0 in, an overall width Wo ranging from about 1.0 in to about 48.0 in, and an overall thickness To ranging from about 0.10 in to about 1.0 in. As shown in FIG. 7C, in some embodiments, substrate 100 has an "active" pad area that is less than an overall area of substrate 100, with the "active" pad area designating a pad area within which (i) activated carbon 11 and/or superabsorbent particles 19. As shown in FIG. 7C, exemplary substrate 100 has an "active" pad area with an active area length $L_A$, and an active area width $W_A$, 62. The method of any one of embodiments 1 to 61, wherein the substrate 100 has an overall length $L_O$ ranging from about 3.0 in to about 12.0 in, an overall width $W_O$ ranging from about 9.0 in to about 12.0 in, and an overall thickness To ranging from about 0.15 in to about 0.5 in.

63. The method of any one of embodiments 1 to 62, wherein the substrate 100 further comprises a stripe 130 that undergoes a color change when exposed to a color-changing liquid. See, for example, substrate 100 shown in FIGS. 6A-6B.

64. The method of embodiment 63, wherein the color-changing liquid is water.

65. The method of embodiment 63, wherein the color-changing liquid is the one or more liquid pharmaceuticals 10.

66. The method of any one of embodiments 63 to 65, wherein said depositing step causes the stripe of the stripe 130 to undergo a color change.

67. The method of any one of embodiments 1 to 66, further comprising positioning the substrate 100 proximate to, on, or within a container 200. See, exemplary container 200 shown in FIGS. 9A and 9B.

68. The method of any one of embodiments 1 to 67, further comprising positioning the substrate 100 proximate to a container 200.

69. The method of any one of embodiments 1 to 68, further comprising positioning the substrate 100 on a container 200. For example, substrate 100 may be adhesively attached to an outer surface 201 of container 200 via an adhesive layer 115 (see FIG. 3). It should be understood that any method or means of attaching substrate 100 to an outer surface 201 of container 200 may be utilized. After use, substrate 100 may be removed from outer surface 201 of container 200 and inputted into a container volume 202 within container 200.

70. The method of any one of embodiments 1 to 69, further comprising positioning the substrate 100 within a container 200.

71. The method of any one of embodiments 67 to 70, wherein the container 100 comprises: a container housing 203 surrounding a container volume 202, a container opening 204 providing access to the container volume 202 from outside the container housing 203, and a movable container housing closure member 205 sized to extend over and cover the container opening 204.

72. The method of any one of embodiments 67 to 71, wherein said method further comprises: depositing one or more syringes 30, one or more needles 31, or any combination thereof into the container 200. As discussed above, after use, substrate 100 (with (i) one or more liquid pharmaceuticals 10 therein or thereon and/or (ii) liquid radioactive medical waste 40 therein or thereon) may be positioned in container volume 202 within container 200.

73. The method of any one of embodiments 1 to 72, wherein said depositing step comprises using a syringe 30 to incorporate the one or more liquid pharmaceuticals 10 (and/or liquid radioactive medical waste 40) into or onto the substrate 100. In other embodiments, the depositing step may comprise pouring the one or more liquid pharmaceuticals 10 (and/or liquid radioactive medical waste 40) onto an upper surface 121 of the substrate 100.

74. The method of any one of embodiments 1 to 73, wherein one or more layers of the substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) (or liquid radioactive medical waste 40) and (ii) deters or prevents recovery of the liquid pharmaceuticals 10 (or dissolved solid pharmaceuticals 20 in, e.g., water) (or liquid radioactive medical waste 40), or (C) both (A) and (B). For example, (a) one or more additional absorbent materials (not shown), (b) one or more materials (not shown) that (i) bind or chemically alter the liquid pharmaceuticals 10 (or dissolved solid pharmaceuticals 20 in, e.g., water) (or liquid radioactive medical waste 40) and (ii) deter or prevent recovery of the liquid pharmaceuticals 10 (or dissolved solid pharmaceuticals 20 in, e.g., water) (or liquid radioactive medical waste 40), or (c) both (a) and (b) could be present in any one or all of: (i) the one or more fiber-containing layers 110, (ii) the one or more layers containing activated carbon 111, (iii) the one or more layers containing superabsorbent particles 114, or (iv) any combination of (i), (ii) and (iii).

75. The method of any one of embodiments 1 to 74, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

76. The method of any one of embodiments 1 to 75, wherein the substrate 100 comprises from about 1.2 g to about 12.0 g of the activated carbon 11.

77. The method of any one of embodiments 20 to 76, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

78. The method of any one of embodiments 20 to 77, wherein the substrate 100 comprises from about 1.2 g to about 12.0 g of the superabsorbent particles 19.

79. The method of any one of embodiments 1 to 64 and 66 to 78, wherein said method comprises a method of disposing of liquid radioactive medical waste 40.

80. The method of embodiment 79, wherein the liquid radioactive medical waste 40 is generated by radioisotope research, nuclear medicine, radiation oncology, and/or positron emission tomography (PET).

Waste Disposal Kits

81. A waste disposal kit 1000 suitable for use in the method of any one of embodiments 1 to 80, said kit 1000 comprising: the substrate 100 comprising (a)(i) fibers 18, (ii) foam, or (iii) both fibers 18 and foam, and (b) activated carbon 11.

82. A waste disposal kit 1000 comprising: a substrate 100 comprising (a)(i) fibers 18, (ii) foam (not shown), or (iii) both fibers 18 and foam, and (b) activated carbon 11.

83. The waste disposal kit 1000 of embodiment 81 or 82, wherein the substrate 100 comprises fibers 18.

84. The waste disposal kit 1000 of any one of embodiments 81 to 83, wherein the substrate 100 comprises at least one fiber-containing layer 110.

85. The waste disposal kit 1000 of any one of embodiments 81 to 84, wherein the substrate 100 comprises two or more fiber-containing layers 110.

86. The waste disposal kit 1000 of any one of embodiments 81 to 85, wherein the substrate 100 comprises one or more nonwoven layers 110, one or more paper layers 110, one or more woven layers 110, one or more knit layers 110, or any combination thereof.

87. The waste disposal kit 1000 of any one of embodiments 81 to 86, wherein said substrate 100 comprises one or more nonwoven layers 110.

88. The waste disposal kit 1000 of any one of embodiments 81 to 87, wherein said substrate 100 comprises foam (not shown).

89. The waste disposal kit 1000 of any one of embodiments 81 to 88, wherein said substrate 100 comprises at least one foam-containing layer 110.

90. The waste disposal kit 1000 of any one of embodiments 81 to 89, wherein said substrate 100 comprises two or more foam-containing layers 110.

91. The waste disposal kit 1000 of any one of embodiments 81 to 90, wherein said substrate 100 comprises an outermost fiber-containing layer 110.

92. The waste disposal kit 1000 of any one of embodiments 81 to 91, wherein said substrate 100 comprises an outermost foam-containing layer 110.

93. The waste disposal kit 1000 of any one of embodiments 81 to 91, wherein said substrate 100 comprises an outermost non-penetrable layer 112 (e.g., one that a needle cannot push thru, for example, a film layer, a liquid impermeable polymer film layer, an epoxy layer, a metal layer, a hard plastic layer, or combinations thereof).

Figure 1:
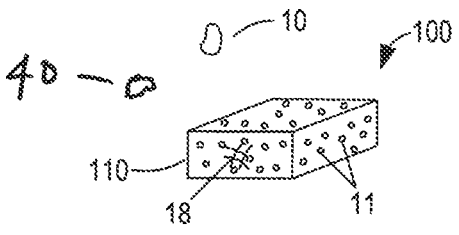
FIG. 1 depicts a perspective view of an exemplary substrate suitable for use in waste disposal kits of the present invention.
Figure 2:
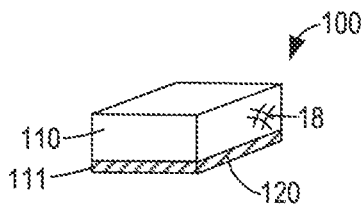
FIG. 2 depicts a perspective view of another exemplary substrate suitable for use in waste disposal kits of the present invention.
Figure 3:
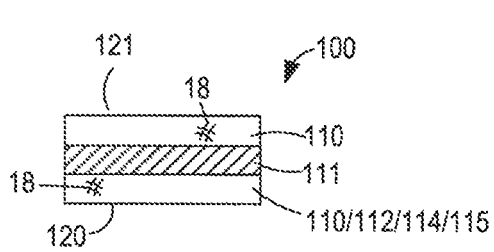
FIG. 3 depicts a side view of another exemplary substrate suitable for use in waste disposal kits of the present invention.
Figure 4:
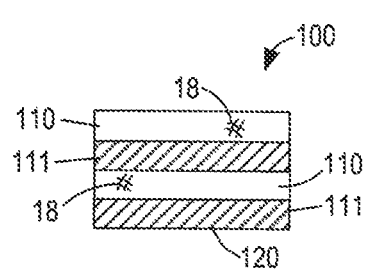
FIG. 4 depicts a side view of another exemplary substrate suitable for use in waste disposal kits of the present invention.

94. The waste disposal kit 1000 of any one of embodiments 81 to 93, wherein the activated carbon 11 is present as a layer of activated carbon 111. As shown in FIG. 1, alternatively, the activated carbon 11 may be disbursed throughout a layer containing other substrate components such as fibers 18, foam or both.

95. The waste disposal kit 1000 of any one of embodiments 81 to 94, wherein the activated carbon 11 is present as a layer of activated carbon 111 extending along an outer surface 120/121/122/123 of said substrate 100.

96. The waste disposal kit 1000 of any one of embodiments 81 to 94, wherein the activated carbon 11 is present as a layer of activated carbon 111 extending within said substrate 100 and positioned a distance from opposite major outer surfaces 120/121 of said substrate 100.

97. The waste disposal kit 1000 of any one of embodiments 81 to 96, wherein the activated carbon 11 is present as two or more layers of activated carbon 111.

98. The waste disposal kit 1000 of any one of embodiments 81 to 97, wherein the activated carbon 11 is present within two or more layers 110/111/112 of the substrate 100.

99. The waste disposal kit 1000 of any one of embodiments 81 to 98, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

100. The waste disposal kit 1000 of any one of embodiments 81 to 99, wherein the activated carbon 11 is not present within at least one layer 110/112 of the substrate 100.

101. The waste disposal kit 1000 of any one of embodiments 81 to 100, wherein the substrate 100 further comprises (c) (i) a gelling agent (not shown), (ii) superabsorbent particles 19, or (iii) both a gelling agent and superabsorbent particles 19. It should be understood that other absorbent materials may be used in combination with, or instead of, the superabsorbent particles 19. Other absorbent materials include both (I) naturally-occurring absorbent materials such as (a) naturally-occurring inorganic materials such as clay, sand, and volcanic ash cotton fibers, (b) naturally-occurring organic materials such as cotton fibers, and (II) synthetic absorbent materials such as polymer sponges, other hydrophilic materials.

102. The waste disposal kit 1000 of embodiment 101, wherein the gelling agent is present as a layer of gelling agent 114.

103. The waste disposal kit 1000 of embodiment 101 or 102, wherein the gelling agent is present as a layer of gelling agent 114 extending along an outer surface 120/121/122/123 of said substrate 100.

104. The waste disposal kit 1000 of any one of embodiments 101 to 103, wherein the gelling agent is present as a layer of gelling agent 114 extending within the substrate 100 and positioned a distance from opposite major outer surfaces 120/121 of the substrate 100.

105. The waste disposal kit 1000 of any one of embodiments 101 to 104, wherein the gelling agent is present as two or more layers of gelling agent 114.

106. The waste disposal kit 1000 of any one of embodiments 101 to 105, wherein the gelling agent is present within two or more layers 110/111/112/114 of the substrate 100.

107. The waste disposal kit 1000 of any one of embodiments 101 to 106, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

108. The waste disposal kit 1000 of any one of embodiments 101 to 107, wherein the gelling agent extends along one or more outer surfaces 120/121/122/123 of the substrate 100.

109. The waste disposal kit 1000 of any one of embodiments 101 to 108, wherein the gelling agent extends along all outer surfaces 120/122/123 of the substrate 100 except an upper surface 121.

110. The waste disposal kit 1000 of any one of embodiments 101 to 109, wherein the superabsorbent particles 19 are present as a layer of superabsorbent particles 114.

111. The waste disposal kit 1000 of any one of embodiments 101 to 110, wherein the superabsorbent particles 19 are present as a layer of superabsorbent particles 114 extending along an outer surface 120/121/122/123 of said substrate 100.

112. The waste disposal kit 1000 of any one of embodiments 101 to 111, wherein the superabsorbent particles 19 are present as a layer of superabsorbent particles 114 extending within the substrate 100 and positioned a distance from opposite major outer surfaces 120/121 of the substrate 100.

113. The waste disposal kit 1000 of any one of embodiments 101 to 112, wherein the superabsorbent particles 19 are present as two or more layers of superabsorbent particles 114.

114. The waste disposal kit 1000 of any one of embodiments 101 to 113, wherein the superabsorbent particles 19 are present within two or more layers 110/111/112/114 of the substrate 100.

115. The waste disposal kit 1000 of any one of embodiments 101 to 114, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

116. The waste disposal kit 1000 of any one of embodiments 101 to 115, wherein the superabsorbent particles 19 extend along one or more outer surfaces 120/121/122/123 of the substrate 100.

117. The waste disposal kit 1000 of any one of embodiments 101 to 116, wherein the superabsorbent particles 19 extend along all outer surfaces 120/122/123 of the substrate 100 except an upper surface 121.

118. The waste disposal kit 1000 of any one of embodiments 78 to 80, 112 and 115, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

119. The waste disposal kit 1000 of embodiment 118, wherein the two layers of the activated carbon are positioned along opposite sides of the layer of superabsorbent particles.

120. The waste disposal kit 1000 of embodiment 118 or 119, wherein the two layers of the activated carbon and the layer of superabsorbent particles are bonded to one another with the layer of superabsorbent particles being sandwiched between the two layers of the activated carbon.

121. The waste disposal kit 1000 of any one of embodiments 118 to 120, wherein the substrate comprises two outermost fiber-containing layers with one outermost fiber-containing layer being positioned along opposite major outer surfaces of the substrate.

122. The waste disposal kit 1000 of embodiment 121, wherein each of the two outermost fiber-containing layers comprises a nonwoven layer.

123. The waste disposal kit 1000 of any one of embodiments 118 to 120, wherein the substrate comprises an outermost non-penetrable layer positioned along an opposite major outer surface from said outermost fiber-containing layer of the substrate. See, for example, substrate 100 shown in FIG. 6.

124. The waste disposal kit 1000 of embodiment 123, wherein (i) the outermost non-penetrable layer comprises a film layer, and (ii) the outermost fiber-containing layer comprises a nonwoven layer. See, for example, substrate 100 shown in FIG. 7.

125. The waste disposal kit 1000 of any one of embodiments 81 to 124, wherein the substrate 100 comprises from two to eight fiber-containing layers 110.

126. The waste disposal kit 1000 of any one of embodiments 81 to 125, wherein the substrate 100 comprises from two to eight nonwoven layers 110.

127. The waste disposal kit 1000 of any one of embodiments 87 to 126, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 gsm to about 180.0 gsm. As noted above, each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

128. The waste disposal kit 1000 of any one of embodiments 87 to 127, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See again, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

129. The waste disposal kit 1000 of any one of embodiments 81 to 128, wherein the substrate 100 comprises from two to six layers containing activated carbon 111.

130. The waste disposal kit 1000 of any one of embodiments 81 to 129, wherein the substrate 100 comprises four layers containing activated carbon 111. See, for example, substrate 100 shown in FIGS. 7A-7D.

131. The waste disposal kit 1000 of any one of embodiments 81 to 130, wherein the substrate 100 comprises (i) at least one layer containing activated carbon 111 in combination with fibers, and (ii) at least one layer containing activated carbon 111 but no fibers.

132. The waste disposal kit 1000 of any one of embodiments 81 to 131, wherein the substrate 100 comprises (i) at least two layers containing activated carbon 111 in combination with fibers, and (ii) at least two layers containing activated carbon 111 but no fibers.

133. The waste disposal kit 1000 of any one of embodiments 81 to 132, wherein the substrate 100 comprises from two to six layers containing superabsorbent particles 114.

134. The waste disposal kit 1000 of any one of embodiments 81 to 133, wherein the substrate 100 comprises from two to three layers containing superabsorbent particles 114. See again, for example, substrate 100 shown in FIGS. 7A-7D.

135. The waste disposal kit 1000 of any one of embodiments 101 to 134, wherein the substrate 100 comprises at least one layer containing a mixture of activated carbon 11 and superabsorbent particles 19. See again, for example, substrate 100 shown in FIGS. 7A-7D.

136. The waste disposal kit 1000 of any one of embodiments 101 to 135, wherein the substrate 100 comprises at least two layers containing a mixture of activated carbon 11 and superabsorbent particles 19. See again, for example, substrate 100 shown in FIGS. 7A-7D.

137. The waste disposal kit 1000 of any one of embodiments 101 to 136, wherein the substrate 100 comprises at least one layer comprising (or consisting of) superabsorbent particles 19. See, for example, substrate 100 shown in FIGS. 7C-7D.

138. The waste disposal kit 1000 of any one of embodiments 101 to 137, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

139. The waste disposal kit 1000 of any one of embodiments 101 to 138, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

140. The waste disposal kit 1000 of any one of embodiments 101 to 139, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

141. The waste disposal kit 1000 of any one of embodiments 101 to 140, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

142. The waste disposal kit 1000 of any one of embodiments 81 to 141, wherein the substrate 100 has an overall length $L_O$ ranging from about 3.0 inches (in) to about 48.0 in, an overall width $W_O$ ranging from about 1.0 in to about 48.0 in, and an overall thickness To ranging from about 0.10 in to about 1.0 in.

143. The waste disposal kit 1000 of any one of embodiments 81 to 142, wherein the substrate 100 has an overall length $L_O$ ranging from about 3.0 in to about 12.0 in, an overall width $W_O$ ranging from about 9.0 in to about 12.0 in, and an overall thickness To ranging from about 0.15 in to about 0.5 in.

144. The waste disposal kit 1000 of any one of embodiments 81 to 143, wherein the substrate 100 further comprises a stripe 130 that undergoes a color change when exposed to a color-changing liquid. It should be understood that stripe 130 may have any shape (e.g., rectangular, square, star-shaped, circular, etc.) and be positioned at any location along substrate 100 (e.g., any outer surface or underneath a clear layer of substrate 100 if present).

145. The waste disposal kit 1000 of embodiment 144, wherein the color-changing liquid is water.

146. The waste disposal kit 1000 of embodiment 144, wherein the color-changing liquid is the one or more liquid pharmaceuticals 10 or liquid radioactive medical waste 40

147. The waste disposal kit 1000 of any one of embodiments 144 to 146, wherein incorporating one or more liquid pharmaceuticals 10 or dissolved solid pharmaceuticals 20 or liquid radioactive medical waste 40 into or onto the substrate 100 causes the stripe 130 of the substrate 100 to undergo a color change.

148. The waste disposal kit 1000 of any one of embodiments 81 to 147, further comprising: a liquid pharmaceutical 10 (or dissolved solid pharmaceuticals 20 in, e.g., water) (or liquid radioactive medical waste 40), on or within the substrate 100.

149. The waste disposal kit 1000 of any one of embodiments 81 to 148, further comprising: a container 200.

150. The waste disposal kit 1000 of any one of embodiments 81 to 149, further comprising: a container 200, wherein the substrate 100 is positioned proximate, on or within the container 200.

151. The waste disposal kit 1000 of embodiment 150, wherein the substrate 100 is proximate the container 200.

152. The waste disposal kit 1000 of embodiment 150 or 151, wherein the substrate 100 is on the container 200.

153. The waste disposal kit 1000 of any one of embodiments 150 to 152, wherein the substrate 100 is within the container 200.

154. The waste disposal kit 1000 of any one of embodiments 149 to 153, further comprising: one or more syringes 30, one or more needles 31, or any combination thereof within the container.

155. The waste disposal kit 1000 of any one of embodiments 149 to 154, wherein the container 200 comprises: a container housing 203 surrounding a container volume 202, a container opening 204 providing access to the container volume 202 from outside the container housing 203, and a movable container housing closure member 205 sized to extend over and cover the container opening 204. Typically, container volume 202 may be as little as 0.1 gallons up to about ten gallons (or any amount in increments of 0.1 gallons up to 10.0 gallons).

156. A waste disposal kit 1000 comprising: a substrate 100 comprising (a)(i) fibers 18, (ii) foam (not shown), or (iii) both fibers and foam, and (b) activated carbon 11; and (c) a container 200 comprising: a container housing 203 surrounding a container volume 202, a container opening 204 providing access to said container volume 202 from outside said container housing 203, and a movable container housing closure member 205 sized to extend over and cover said container opening 204, wherein said substrate 100 is proximate, on or within said container 200.

157. The waste disposal kit 1000 of embodiment 156, wherein the substrate 100 is proximate the container 200.

158. The waste disposal kit 1000 of embodiment 156 or 157, wherein the substrate 100 is on the container 200.

159. The waste disposal kit 1000 of any one of embodiments 156 to 158, wherein the substrate 100 is within the container 200.

160. The waste disposal kit 1000 of any one of embodiments 156 to 159, wherein the substrate 100 comprises the substrate 100 described in any one of embodiments 81 to 148.

161. The waste disposal kit 1000 of any one of embodiments 156 to 160, wherein the substrate 100 further comprises a stripe 130 that undergoes a color change when exposed to a color-changing liquid.

162. The waste disposal kit 1000 of embodiment 161, wherein the color-changing liquid is water.

163. The waste disposal kit 1000 of embodiment 161, wherein the color-changing liquid is the one or more liquid pharmaceuticals 10 or liquid radioactive medical waste 40.

164. The waste disposal kit 1000 of any one of embodiments 161 to 163, wherein the stripe 130 is positioned along an upper surface 121 of the substrate 100.

165. The waste disposal kit 1000 of any one of embodiments 157 to 164, wherein said stripe 130 undergoes a color change when said stripe 130 is contacted with a liquid pharmaceutical 10 or dissolved solid pharmaceuticals 20 in water 14 or liquid radioactive medical waste 40.

166. The waste disposal kit 1000 of any one of embodiments 157 to 165, wherein said container 200 further comprises one or more syringes 30, one or more needles 31, or any combination thereof.

167. The waste disposal kit 1000 of any one of embodiments 157 to 166, further comprising: a liquid pharmaceutical 10 or liquid radioactive medical waste 40 on or within the substrate 100.

168. The waste disposal kit 1000 of any one of embodiments 81 to 167, wherein the substrate 100 further comprises: one or more adhesive layers 115 to enable substrate 100 to be adhered to a surface (e.g., an outer surface 201 of container 200).

169. The waste disposal kit 1000 of embodiment 168, wherein the substrate 100 further comprises: a release liner (not shown) over an exposable adhesive layer 115.

170. The waste disposal kit 1000 of any one of embodiments 81 to 169, wherein one or more layers of said substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) (or liquid radioactive medical waste 40) and (ii) deters or prevents recovery of the liquid pharmaceuticals 10 (or dissolved solid pharmaceuticals 20 in, e.g., water) (or liquid radioactive medical waste 40), or (C) both (A) and (B).

171. The waste disposal kit 1000 of any one of embodiments 81 to 170, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

172. The waste disposal kit 1000 of any one of embodiments 81 to 171, wherein the substrate 100 comprises from about 1.2 g to about 12.0 g of the activated carbon 11.

173. The waste disposal kit 1000 of any one of embodiments 101 to 172, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

174. The waste disposal kit 1000 of any one of embodiments 101 to 173, wherein the substrate 100 comprises from about 1.2 g to about 12.0 g of the superabsorbent particles 19.

It should be understood that although substrate 100 is shown as having one or more layers, as shown in FIGS. 1-7, substrate 100 may further comprise any number of additional layers in addition to those shown in the figures. For example, in some embodiments, any of the above-described substrates 100 may be at least partially, or completely, encased within a permeable outer cover (not shown). The permeable outer cover may comprise a permeable material alone, such as a nonwoven (or woven or knit) fabric layer, or may comprise a combination of a permeable material and an impermeable material. For example, the permeable outer cover may comprise a permeable top/upper layer (e.g., a nonwoven fabric layer) and an impermeable bottom/lower layer (e.g., a nonwoven fabric layer coated and/or impregnated with an impermeable coating/impregnant such as a rubber-based composition, or a rubber or polymeric film layer) with any sides connecting the permeable top/upper layer to the impermeable bottom/lower layer, when present, comprising either a permeable or impermeable material.

Additional Methods of Disposing of Solid Pharmaceuticals

175. A method of disposing of solid pharmaceuticals 20 (e.g., pills, transdermal patches, etc.), said method comprising: partially filling a pill bottle containing discardable (i.e., unused or expired) solid pharmaceuticals 20 with water; and pouring/placing a solidifying composition into the pill bottle 200/200', the solidifying composition comprising (a) activated carbon and (b)(i) a gelling agent (not shown), (ii) superabsorbent particles 19, (iii) a polymerizable composition comprising a first monomeric component 13 that is capable of polymerization when combined with an effective amount of a polymerization initiator 15, or (iv) any combination of (i), (ii), and (iii). Suitable first monomeric components 13 and polymerization initiators 15 include any of those described herein.

176. The method of embodiment 175, wherein the activated carbon is incorporated within the gelling agent. In some embodiments, the gelling agent may be impregnated with activated carbon 11. In some embodiments, the superabsorbent particles 19 may be impregnated with activated carbon 11.

177. The method of embodiment 175 or 176, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

178. The method of any one of embodiments 175 to 177, further comprising: capping the pill bottle 200/200'; and shaking contents within the pill bottle 200/200'.

179. A method of disposing of liquid/solid pharmaceuticals 10/20 or liquid radioactive medical waste 40, said method comprising: depositing one or more pharmaceuticals 10/20 or liquid radioactive medical waste 40 or the substrate 100 of any one of embodiments 81 to 174 into a container 200 containing (i) a first monomeric component 13 and (ii) water 14, the first monomeric component 13 being capable of polymerization when combined with an effective amount of a polymerization initiator 15.

180. The method of embodiment 179, wherein the first monomeric component 13 comprises an acrylic or acrylamide monomer.

181. The method of embodiment 179 or 180, wherein the first monomeric component 13 comprises an acrylic monomer having the structure:

$$(R^1)(R^2)C{=}C(R^3)(R^4)$$

wherein:

$R^1$ is —COOH, —COOR$^5$, —CONHOH, —CONHCH$_2$OH, or —CONH$_2$;

$R^2$ is —H, —CH$_3$, CH$_3$CH$_2$—, or —CN;

each of $R^3$ and $R^4$ is independently —H, —CH$_3$, CH$_3$CH$_2$—, or a halogen; and $R^5$ is a C$_{1-2}$alkyl, a C$_{1-12}$alkoxyalkyl, a C$_{1-12}$hydroxyalkyl, an acrylamide, or an alkylene-bis-acrylamide.

182. The method of any one of embodiments 179 to 181, wherein the first monomeric component 13 comprises N-methylolacrylamide, acrylic acid, acrylamide, an acrylic ester, or acrylonitrile.

183. The method of any one of embodiments 179 to 182, wherein the first monomeric component 13 comprises N-methylolacrylamide.

184. The method of any one of embodiments 179 to 183, wherein the container 200 further comprises a reducing agent 16 mixed with (i) the activated carbon 11, (ii) the first monomeric component 13 and (iii) the water 14.

185. The method of embodiment 184, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

186. The method of embodiment 179 or 185, wherein the reducing agent 16 comprises a tertiary amine comprising tetramethylethylenediamine, N,N-dimethyl-toluedine or N,N-dihydroxyethyl-paratoluedine.

187. The method of any one of embodiments 179 to 186, wherein the container 200 further comprises a free radical scavenger 17 mixed with (i) the activated carbon 11, (ii) the first monomeric component 13 and (iii) the water 14.

188. The method of embodiment 187, wherein the free radical scavenger 17 comprises hydroquinone, monoethyl ether of hydroquinone, butylated hydroxyanisole, butylated hydroxytoluene, and t-butyl hydroquinone.

189. The method of any one of embodiments 179 to 188, wherein the container 200 further comprises one or more pharmaceuticals 20 or liquid radioactive medical waste 40 within (i) the activated carbon 11, (ii) the first monomeric component 13 and (iii) the water 14.

190. The method of any one of embodiments 179 to 189, further comprising: incorporating the polymerization initiator 15 into the container 200 in an effective amount to cause polymerization of the first monomeric component 13.

191. The method of any one of embodiments 179 to 190, wherein the polymerization initiator 15 comprises zinc formaldehyde sulfoxylate, ammonium persulfate, a peroxide, or a perborate.

192. The method of any one of embodiments 179 to 191, wherein the polymerization initiator 15 comprises zinc formaldehyde sulfoxylate.

193. The method of any one of embodiments 179 to 192, wherein the container 200 comprises: a container housing 203 surrounding a container volume 202, a container opening 204 providing access to the container volume 202 from outside the container housing 203, and a movable container housing closure member 205 sized to extend over and cover the container opening 204.

194. The method of embodiments 190 to 193, wherein said incorporating step causes a mixture 24 within the container 200 to undergo a color change.

195. The method of any one of embodiments 179 to 194, wherein the container 200 further comprises a colorant 32 in addition to (i) the activated carbon 11, (ii) the first monomeric component 13 and (iii) the water 14.

196. The method of any one of embodiments 179 to 195, wherein the container 200 further comprises a colorant 32 in addition to (i) the first monomeric component 13 and (iii) the water 14, the colorant 32 comprising a red dye.

197. The method of embodiment 196, wherein said incorporating step causes the water 14 within the container 200 to undergo a color change from a red color to a yellow/orange color (or a weak yellow color or an opaque colorless solid).

198. The method of any one of embodiments 179 to 197, wherein said method further comprises: depositing one or more syringes 30, one or more needles 31, the one or more substrates 100 described in any one of embodiments 1 to 148, or any combination thereof into the container 200.

199. The method of any one of embodiments 179 to 197, wherein the container 200 further comprises one or more of, or all of: (i) the first monomeric component 13, (ii) the water 14, (iv) reducing agent 16, (v) the free radical scavenger 17, (vi) one or more substrates 100 described in any one of embodiments 1 to 174, and (vii) the colorant 32, separate from or in combination with, (viii) an effective amount of the polymerization initiator 15 as recited in any one of embodiments 190 to 192.

Waste Disposal Kits

200. A waste disposal kit 1000 comprising: (I) a container 200 comprising: a container housing 203 surrounding a container volume 202, a container opening 204 providing access to said container volume 202 from outside said container housing 203, and a movable container housing closure member 205 sized to extend over and cover said container opening 204; and (II) a mixture 24 within container 200, said mixture 24 comprising: (i) water 14 occupying at least a portion of said container volume 202, (ii) optionally activated carbon 11, and (iii) a first monomeric component 13 capable of polymerization when combined with an effective amount of a polymerization initiator 15. During use, mixture 24 may further comprise (III) at least one pharmaceutical 20 within said mixture 24. Waste disposal kit 1000 may further comprise an optional wall or under-the-counter mounting device for mounting container 200 along a wall surface or under a counter. As discussed above, movable container housing closure member 205 may be in the form of a safety cap 205 to prevent a user's hand from extending into container 200.

201. The waste disposal kit 1000 of embodiment 200, wherein said first monomeric component 13 comprises an acrylic or acrylamide monomer.

202. The waste disposal kit 1000 of embodiment 200 or 201, wherein said first monomeric component 13 comprises an acrylic monomer having the structure:

$$(R^1)(R^2)C=C(R^3)(R^4)$$

wherein:

$R^1$ is —COOH, —COOR$^5$, —CONHOH, —CONHCH$_2$OH, or —CONH$_2$;

$R^2$ is —H, —CH$_3$, CH$_3$CH$_2$—, or —CN;

each of $R^3$ and $R^4$ is independently —H, —CH$_3$, CH$_3$CH$_2$—, or a halogen; and $R^5$ is a C$_{1-12}$alkyl, a C$_{1-12}$alkoxyalkyl, a C$_{1-12}$hydroxyalkyl, an acrylamide, or an alkylene-bis-acrylamide.

203. The waste disposal kit 1000 of any one of embodiments 200 to 202, wherein said first monomeric component 13 comprises N-methylolacrylamide, acrylic acid, acrylamide, an acrylic ester, or acrylonitrile.

204. The waste disposal kit 1000 of any one of embodiments 200 to 203, wherein said first monomeric component 13 comprises N-methylolacrylamide.

205. The waste disposal kit 1000 of any one of embodiments 200 to 204, wherein said container 200 further comprises a reducing agent 16 mixed with (i) said first monomeric component 13, (ii) said optional activated carbon 11, and (iii) said water 14.

206. The waste disposal kit 1000 of embodiment 205, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

207. The waste disposal kit 1000 of embodiment 205 or 206, wherein said reducing agent 16 comprises a tertiary amine comprising, tetramethylethylenediamine, N,N-dimethyl-toluedine or N,N-dihydroxyethyl-paratoluedine.

208. The waste disposal kit 1000 of any one of embodiments 200 to 207, wherein said container 200 further comprises a free radical scavenger 17 mixed with (i) said first monomeric component 13, (ii) said optional activated carbon 11, and (iii) said water 14.

209. The waste disposal kit 1000 of embodiment 208, wherein said free radical scavenger 17 comprises hydroquinone, monoethyl ether of hydroquinone, butylated hydroxyanisole, butylated hydroxytoluene, and t-butyl hydroquinone.

210. The waste disposal kit 1000 of any one of embodiments 200 to 209, wherein said container 200 further comprises a polymerization initiator 15 in an effective amount to cause polymerization of said first monomeric component 13.

211. The waste disposal kit 1000 of embodiment 210, wherein said polymerization initiator 15 comprises zinc formaldehyde sulfoxylate, ammonium persulfate, a peroxide, or a perborate.

212. The waste disposal kit 1000 of embodiment 210 or 211, wherein said polymerization initiator 15 comprises zinc formaldehyde sulfoxylate.

213. The waste disposal kit 1000 of any one of embodiments 200 to 212, wherein said container volume 202 comprises up to about ten gallons (or any amount in increments of 0.1 gallons up to 10.0 gallons).

214. The waste disposal kit 1000 of any one of embodiments 200 to 213, wherein said container volume 202 comprises from about 1.0 to about 5.0 gallons (or any amount in increments of 0.1 gallons between 1.1 and 4.9 gallons).

215. The waste disposal kit 1000 of any one of embodiments 200 to 214, wherein said movable container housing closure member 205 comprises a removable lid 205 having lid engaging members 230 that engage with corresponding housing engaging members 250.

216. The waste disposal kit 1000 of any one of embodiments 210 to 215, wherein said polymerization initiator 15 is packaged separately from said first monomeric component 13 prior to being combined with said first monomeric component 13.

217. The waste disposal kit 1000 of embodiment 216, wherein said polymerization initiator 15 is packaged within a plastic bag or container 12.

218. The waste disposal kit 1000 of any one of embodiments 200 to 217, wherein said mixture 24 further comprises a colorant 32.

219. The waste disposal kit 1000 of embodiment 218, wherein said colorant 32 comprises a red dye.

220. The waste disposal kit 1000 of embodiment 218 or 219, wherein said colorant 32 undergoes a color change when said mixture 24 is contacted with said polymerization initiator 15.

221. The waste disposal kit 1000 of any one of embodiments 200 to 220, wherein said mixture 24 further comprises one or more syringes 30, one or more needles 31, one or more substrates 100 described in any one of embodiments 1 to 174, or any combination thereof.

Waste and/or Sharps Disposal Kits

222. A waste and/or sharps disposal kit 1000 comprising: (I) a container 200 comprising: a container housing 203 surrounding a container volume 202, a container opening 205 providing access to said container volume 202 from outside said container housing 203, and a movable container housing closure member 205 sized to extend over and cover said container opening 204; and (II) a mixture 24 within said container 200, said mixture 24 comprising: (i) water 14 occupying at least a portion of said container volume 202, (ii) optionally activated carbon 11, (iii) a first monomeric component 13 capable of polymerization when combined with an effective amount of a polymerization initiator 15, and (iv) an optional colorant 32, said colorant 32 enabling said mixture 24 to undergo a color change when combined with said effective amount of said polymerization initiator 15.

223. The waste and/or sharps disposal kit 1000 of embodiment 222, wherein said first monomeric component 13 comprises an acrylic or acrylamide monomer.

224. The waste and/or sharps disposal kit 1000 of embodiment 222 or 223, wherein said first monomeric component 13 comprises an acrylic monomer having the structure:

$$(R^1)(R^2)C=C(R^3)(R^4)$$

wherein:

R$^1$ is —COOH, —COOR$^5$, —CONHOH, —CONHCH$_2$OH, or —CONH$_2$;

R$^2$ is —H, —CH$_3$, CH$_3$CH$_2$—, or —CN;

each of R$^3$ and R$^4$ is independently —H, —CH$_3$, CH$_3$CH$_2$—, or a halogen; and R$^5$ is a C$_{1-12}$-alkyl, a C$_{1-12}$alkoxyalkyl, a C$_{1-12}$hydroxyalkyl, an acrylamide, or an alkylene-bis-acrylamide.

225. The waste and/or sharps disposal kit 1000 of any one of embodiments 222 to 224, wherein said first monomeric component 13 comprises N-methylolacrylamide, acrylic acid, acrylamide, an acrylic ester, or acrylonitrile.

225. The waste and/or sharps disposal kit 1000 of any one of embodiments 222 to 225, wherein said first monomeric component 13 comprises N-methylolacrylamide.

227. The waste and/or sharps disposal kit 1000 of any one of embodiments 222 to 226, wherein said mixture 24 further comprises a reducing agent 16 mixed with (i) said first monomeric component 13, (ii) said optional activated carbon 11, (iii) said water 14 and (iv) said colorant 32.

228. The waste and/or sharps disposal kit 1000 of embodiment 227, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

229. The waste and/or sharps disposal kit 1000 of embodiment 227 or 228, wherein said reducing agent 16 comprises a tertiary amine comprising tetramethylethylenediamine, N,N-dimethyl-toluedine or N,N-dihydroxyethyl-paratoluedine.

230. The waste and/or sharps disposal kit 1000 of any one of embodiments 222 to 229, wherein said mixture 24 further comprises a free radical scavenger 17 mixed with (i) said first monomeric component 13, (ii) said optional activated carbon 11, (iii) said water 14 and (iv) said colorant 32.

231. The waste and/or sharps disposal kit 1000 of embodiment 230, wherein said free radical scavenger 17 comprises hydroquinone, monoethyl ether of hydroquinone, butylated hydroxyanisole, butylated hydroxytoluene, and t-butyl hydroquinone.

232. The waste and/or sharps disposal kit 1000 of any one of embodiments 222 to 231, wherein said colorant 32 comprises a red dye 32.

233. The waste and/or sharps disposal kit 1000 of embodiment 232, wherein said red dye 32 enables a color change of said mixture 24 from a red color to a yellow/orange color when combined with said effective amount of said polymerization initiator 15.

234. The waste and/or sharps disposal kit 1000 of any one of embodiments 222 to 233, wherein said container 200 further comprises a polymerization initiator 15 in an effective amount to cause polymerization of said first monomeric component 13.

235. The waste and/or sharps disposal kit 1000 of embodiment 234, wherein said polymerization initiator 15 comprises zinc formaldehyde sulfoxylate, ammonium persulfate, a peroxide, or a perborate.

236. The waste and/or sharps disposal kit 1000 of embodiment 234 or 235, wherein said polymerization initiator 15 comprises zinc formaldehyde sulfoxylate.

237. The waste and/or sharps disposal kit 1000 of any one of embodiments 222 to 236, wherein said container volume 202 comprises up to about ten gallons.

238. The waste and/or sharps disposal kit 1000 of any one of embodiments 222 to 237, wherein said container volume 202 comprises from about 1.0 to about 5.0 gallons.

239. The waste and/or sharps disposal kit 1000 of any one of embodiments 222 to 238, wherein said movable container housing closure member 205 comprises a removable lid 205 having lid engaging members 230 that engage with corresponding housing engaging members 250.

240. The waste and/or sharps disposal kit 1000 of any one of embodiments 234 to 239, wherein said polymerization initiator 15 is packaged separately from said first monomeric component 13 prior to being combined with said first monomeric component 13.

241. The waste and/or sharps disposal kit 1000 of embodiment 240, wherein said polymerization initiator 15 is packaged within a plastic bag or container 12.

242. The waste and/or sharps disposal kit 1000 of any one of embodiments 222 to 241, wherein said container 200 further comprises one or more pharmaceuticals 20, liquid radioactive medical waste 40, one or more syringes 30, one or more needles 31, one or more substrates 100 described in any one of embodiments 1 to 174, or any combination thereof within said mixture 24.

243. The waste and/or sharps disposal kit 1000 of any one of embodiments 222 to 242, wherein said container 200 further comprises one or more syringes 30, one or more needles 31, one or more substrates 100 described in any one of embodiments 1 to 174, or any combination thereof within said mixture 24.

244. The waste and/or sharps disposal kit 1000 of any one of embodiments 222 to 243, wherein said container 200 further comprises one or more pharmaceuticals 20 or liquid radioactive medical waste 40 within said mixture 24.

245. The waste and/or sharps disposal kit 1000 of any one of embodiments 222 to 244, wherein said container 200 further comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 234 to 236.

Methods of Disposing of Waste and/or Sharps

246. A method of disposing of pharmaceutical 20 and/or liquid radioactive medical waste 40 and/or sharps 30/31, said method comprising: depositing one or more pharmaceuticals 20, or liquid radioactive medical waste 40, one or more syringes 30, one or more needles 31, one or more substrates 100 described in any one of embodiments 1 to 174, or any combination thereof into a container 200 containing a mixture 24 of: (i) water 14, (ii) optional activated carbon 11, (iii) a first monomeric component 13 capable of polymerization when combined with an effective amount of a polymerization initiator 15, and (iv) an optional colorant

32, the colorant 32 enabling the mixture 24 to undergo a color change when combined with the effective amount of the polymerization initiator 15.

247. The method of embodiment 244, wherein the first monomeric component 13 comprises an acrylic or acrylamide monomer.

248. The method of embodiment 246 or 247, wherein the first monomeric component 13 comprises an acrylic monomer having the structure:

$$(R^1)(R^2)C=C(R^3)(R^4)$$

wherein:

R$^1$ is —COOH, —COOR$^5$, —CONHOH, —CONHCH$_2$OH, or —CONH$_2$;

R$^2$ is —H, —CH$_3$, CH$_3$CH$_2$—, or —CN;

each of R$^3$ and R$^4$ is independently —H, —CH$_3$, CH$_3$CH$_2$—, or a halogen; and R$^5$ is a C$_{1-12}$alkyl, a C$_{1-12}$alkoxyalkyl, a C$_{1-12}$hydroxyalkyl, an acrylamide, or an alkylene-bis-acrylamide.

249. The method of any one of embodiments 246 to 248, wherein the first monomeric component 13 comprises N-methylolacrylamide, acrylic acid, acrylamide, an acrylic ester, or acrylonitrile.

250. The method of any one of embodiments 246 to 249, wherein the first monomeric component 13 comprises N-methylolacrylamide.

251. The method of any one of embodiments 246 to 250, wherein the mixture 24 further comprises a reducing agent 16 mixed with (i) the first monomeric component 13, (ii) the optional activated carbon 11, (iii) the water 14, and (iv) the colorant 32.

252. The method of embodiment 251, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

253. The method of embodiment 251 or 252, wherein the reducing agent 16 comprises a tertiary amine comprising tetramethylethylenediamine, N,N-dimethyl-toluedine or N,N-dihydroxyethyl-paratoluedine.

254. The method of any one of embodiments 246 to 253, wherein the mixture 24 further comprises a free radical scavenger 17 mixed with (i) the first monomeric component 13, (ii) the optional activated carbon 11, (iii) the water 14, and (iv) the colorant 32.

255. The method of embodiment 254, wherein the free radical scavenger 17 comprises hydroquinone, monoethyl ether of hydroquinone, butylated hydroxyanisole, butylated hydroxytoluene, and t-butyl hydroquinone.

256. The method of any one of embodiments 246 to 255, wherein the mixture 24 further comprises one or more pharmaceuticals 20, liquid radioactive medical waste 40, one or more syringes 30, one or more needles 31, or any combination thereof.

257. The method of any one of embodiments 246 to 256, wherein the mixture 24 further comprises one or more syringes 30, one or more needles 31, or any combination thereof.

258. The method of any one of embodiments 246 to 257, wherein the mixture 24 further comprises one or more pharmaceuticals 20 or liquid radioactive medical waste 40.

259. The method of any one of embodiments 246 to 258, wherein the colorant 32 comprises a red dye.

260. The method of any one of embodiments 246 to 259, further comprising: incorporating the polymerization initiator 15 into the container 200 in an effective amount to cause polymerization of the first monomeric component 13.

261. The method of any one of embodiments 246 to 260, wherein the polymerization initiator 15 comprises zinc formaldehyde sulfoxylate, ammonium persulfate, a peroxide, or a perborate.

262. The method of any one of embodiments 246 to 261, wherein the polymerization initiator 15 comprises zinc formaldehyde sulfoxylate.

263. The method of any one of embodiments 246 to 262, wherein the container 200 comprises: a container housing 203 surrounding a container volume 202, a container opening 204 providing access to the container volume 202 from outside the container housing 203, and a movable container housing closure member 205 sized to extend over and cover the container opening 204.

Additional Solid Pharmaceutical Disposal Kits

264. A solid pharmaceutical disposal kit comprising: a solidifying composition, the solidifying composition comprising activated carbon 11 and (i) a gelling agent (not shown), (ii) superabsorbent particles 19, (iii) a first monomeric component 13 that is capable of polymerization when combined with an effective amount of a polymerization initiator 15, or (iv) any combination of (i), (ii), and (iii). The gelling agent can be any of the above-described gelling agents or superabsorbent particles 19. Suitable first monomeric components 13 and polymerization initiators 15 include any of those described herein.

265. The solid pharmaceutical disposal kit of embodiment 264, wherein the activated carbon 11 is incorporated within the gelling agent. In some embodiments, the gelling agent may be impregnated with activated carbon 11. In some embodiments, the superabsorbent particles 19 may be impregnated with activated carbon 11. In some embodiments, the first monomeric component 13 may be combined with activated carbon 11.

266. The solid pharmaceutical disposal kit of embodiment 264 or 265, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

267. The solid pharmaceutical disposal kit of any one of embodiments 264 to 266, wherein the solidifying composition comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 232 to 234.

Waste-Containing Compositions

268. A waste-containing composition resulting from the method of any one of embodiments 175 to 199. In some embodiments, the waste-containing composition comprises a liquid mixture comprising first monomeric component 13, optional activated carbon 11, water 14 and at least one pharmaceutical 20 and/or liquid radioactive medical waste 40 within the liquid mixture. In other embodiments, the waste-containing composition comprises a solid polymer matrix comprising polymerized first monomeric component 13, optional activated carbon 11, water 14 and at least one pharmaceutical 20 and/or liquid radioactive medical waste 40 within the solid polymer matrix.

269. A composition resulting from the method of embodiment 268, said composition comprising (i) one or more pharmaceuticals 20 and/or liquid radioactive medical waste 40, and at least one of (ii) one or more syringes 30 and (iii) one or more needles 31. In some embodiments, the composition comprises a liquid mixture 24 comprising first monomeric component 13, optional activated carbon 11, water 14, at least one pharmaceutical 20 and/or liquid radioactive medical waste 40, and one or more syringes 30, one or more needles 31, or any combination within the liquid mixture 24. In other embodiments, the waste-containing composition comprises a solid polymer matrix comprising polymerized first monomeric component 13, activated carbon 11, water 14, at least one pharmaceutical 20 and/or liquid radioactive medical waste 40, and one or more syringes 30, one or more needles 31, or any combination within the solid polymer matrix.

Waste- and/or Sharps-Containing Compositions

270. A composition resulting from the method of any one of embodiments 246 to 263. In some embodiments, the composition comprises a liquid mixture 24 comprising first monomeric component 13, optional activated carbon 11, water 14, colorant 32, and one or more of (i) one or more pharmaceuticals 20, (ii) liquid radioactive medical waste 40, (iii) one or more syringes 30, and (iv) one or more needles 31 within the liquid mixture 24. In other embodiments, the composition comprises a solid polymer matrix comprising polymerized first monomeric component 13, optional activated carbon 11, water 14, colorant 32, and one or more of (i) one or more pharmaceuticals 20, (ii) liquid radioactive medical waste 40, (iii) one or more syringes 30, (iv) one or more needles 31, and (v) one or more substrates 100 described in any one of embodiments 1 to 174 within the solid polymer matrix.

Waste Disposal Substrates

271. A waste disposal substrate 100 comprising: the substrate 100 described in any one of embodiments 1 to 221.

272. A waste disposal substrate 100 comprising: (a) at least one layer of fibers, (b) at least one layer comprising activated carbon; and (c) at least one layer comprising superabsorbent particles.

273. The waste disposal substrate 100 of embodiment 271 or 272, wherein the substrate 100 comprises from two to eight fiber-containing layers 110.

274. The waste disposal substrate 100 of any one of embodiments 271 to 273, wherein the substrate 100 comprises from two to eight nonwoven layers 110.

275. The waste disposal substrate 100 of any one of embodiments 271 to 274, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 grams per square meter (gsm) to about 180.0 gsm. As discussed above, each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

276. The waste disposal substrate 100 of any one of embodiments 271 to 275, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See again, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

277. The waste disposal substrate 100 of any one of embodiments 271 to 276, wherein the substrate 100 comprises from two to six layers containing activated carbon 111.

278. The waste disposal substrate 100 of any one of embodiments 271 to 277, wherein the substrate 100 comprises four layers containing activated carbon 111. See, for example, substrate 100 shown in FIGS. 7A-7D.

279. The waste disposal substrate 100 of any one of embodiments 271 to 278, wherein the substrate 100 comprises (i) at least one layer containing activated carbon 111 in combination with fibers, and (ii) at least one layer containing activated carbon 111 but no fibers.

280. The waste disposal substrate 100 of any one of embodiments 271 to 279, wherein the substrate 100 comprises (i) at least two layers containing activated carbon 111 in combination with fibers, and (ii) at least two layers containing activated carbon 111 but no fibers.

281. The waste disposal substrate 100 of any one of embodiments 271 to 280, wherein the substrate 100 comprises from two to six layers containing superabsorbent particles 114.

282. The waste disposal substrate 100 of any one of embodiments 271 to 281, wherein the substrate 100 comprises from two to three layers containing superabsorbent particles 114. See again, for example, substrate 100 shown in FIGS. 7A-7D.

283. The waste disposal substrate 100 of any one of embodiments 271 to 282, wherein the substrate 100 comprises at least one layer containing a mixture of activated carbon 11 and superabsorbent particles 19. See again, for example, substrate 100 shown in FIGS. 7A-7D.

284. The waste disposal substrate 100 of any one of embodiments 271 to 283, wherein the substrate 100 comprises at least two layers containing a mixture of activated carbon 11 and superabsorbent particles 19. See again, for example, substrate 100 shown in FIGS. 7A-7D.

285. The waste disposal substrate 100 of any one of embodiments 271 to 284, wherein the substrate 100 comprises at least one layer comprising (or consisting of) superabsorbent particles 19. See, for example, substrate 100 shown in FIGS. 7C-7D.

286. The waste disposal substrate 100 of any one of embodiments 271 to 285, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

287. The waste disposal substrate 100 of any one of embodiments 271 to 286, wherein the substrate 100 comprises (a) two outermost nonwoven layers 110, (b) two nonwoven layers containing activated carbon adjacent to and between the two outermost nonwoven layers 110, (c)

two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

288. The waste disposal substrate 100 of any one of embodiments 271 to 287, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

289. The waste disposal substrate 100 of any one of embodiments 271 to 288, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

290. The waste disposal substrate 100 of any one of embodiments 271 to 289, wherein the substrate 100 has an overall length $L_O$ ranging from about 3.0 inches (in) to about 48.0 in, an overall width $W_O$ ranging from about 1.0 in to about 48.0 in, and an overall thickness To ranging from about 0.10 in to about 1.0 in.

291. The waste disposal substrate 100 of any one of embodiments 271 to 290, wherein the substrate 100 has an overall length $L_O$ ranging from about 3.0 in to about 12.0 in, an overall width $W_O$ ranging from about 9.0 in to about 12.0 in, and an overall thickness To ranging from about 0.15 in to about 0.5 in.

292. The waste disposal substrate 100 of any one of embodiments 271 to 291, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

293. The waste disposal substrate 100 of any one of embodiments 271 to 292, wherein the substrate 100 comprises from about 1.2 g to about 12.0 g of the activated carbon 11.

294. The waste disposal substrate 100 of any one of embodiments 271 to 293, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

295. The waste disposal substrate 100 of any one of embodiments 271 to 294, wherein the substrate 100 comprises from about 1.2 g to about 12.0 g of the superabsorbent particles 19.

296. The waste disposal substrate 100 of any one of embodiments 271 to 295, wherein the substrate 100 further comprises liquid radioactive medical waste 40 thereon and/or therein.

297. The waste disposal substrate 100 of embodiment 296, wherein the liquid radioactive medical waste 40 is generated by radioisotope research, nuclear medicine, radiation oncology, and/or positron emission tomography (PET).
Methods of Using Waste Disposal Substrates 298. A method of using the waste disposal substrate 100 of any one of embodiments 271 to 297, said method comprising: contacting the waste disposal substrate 100 with a liquid fluid, the waste disposal substrate 100 comprising: (a) at least one layer of fibers 110, (b) at least one layer comprising activated carbon 111; and (c) at least one layer comprising superabsorbent particles 114, wherein the liquid fluid, or a component therein, is collected, dissolved, adsorbed, inactivated, destroyed, and/or disposed of within the waste disposal substrate 100.

299. A method of using a waste disposal substrate 100, said method comprising: contacting the waste disposal substrate 100 with a liquid fluid, the waste disposal substrate 100 comprising: (a) at least one layer of fibers 110, (b) at least one layer comprising activated carbon 111; and (c) at least one layer comprising superabsorbent particles 114, wherein the liquid fluid, or a component therein, is collected, dissolved, adsorbed, inactivated, destroyed, and/or disposed of within the waste disposal substrate 100.

300. The method of embodiment 298 or 299, wherein said contacting step comprises: bringing the waste disposal substrate 100 into contact with the liquid fluid.

301. The method of any one of embodiments 298 to 300, wherein said contacting step comprises: using the waste disposal substrate 100 as a wipe (e.g., a wiping structure having a size and shape similar to a paper towel).

302. The method of any one of embodiments 298 to 301, wherein the liquid fluid comprises one or more of: a liquid pharmaceutical, a liquid phase containing a dissolved solid pharmaceutical, regulated liquid waste, non-regulated liquid waste, and liquid radioactive medical waste 40.

303. The method of any one of embodiments 298 to 302, wherein the liquid fluid comprises a liquid pharmaceutical or a liquid phase containing a dissolved solid pharmaceutical.

304. The method of embodiment 298 or 299, wherein said contacting step comprises: bringing the liquid fluid into contact with the waste disposal substrate 100.

305. The method of any one of embodiments 298 to 299 and 304, wherein said contacting step comprises: introducing the liquid fluid onto and into the waste disposal substrate 100.

306. The method of any one of embodiments 298 to 299 and 304 to 305, wherein the waste disposal substrate is positioned within a container.

307. The method of embodiment 306, wherein the container has a container volume of up to about 10.0 gallons.

308. The method of embodiment 306 or 307, wherein the container volume is from about 1.0 gallon to about 5.0 gallons.

309. The method of any one of embodiments 306 to 308, further comprising: discarding into the container one or more of: a liquid pharmaceutical, a solid pharmaceutical within a liquid phase, regulated waste, non-regulated waste, and liquid radioactive medical waste 40.

310. The method of embodiment 309, further comprising: discarding into the container: a liquid pharmaceutical or a solid pharmaceutical within a liquid phase.

311. The method of any one of embodiments 298 to 299 and 304 to 305, wherein the waste disposal substrate is positioned along a surface in a work or medical or manufacturing setting so as to prevent the liquid fluid from contacting the surface.

312. The method of embodiment 311, wherein the liquid fluid comprises one or more of: a liquid pharmaceutical, a liquid phase containing a dissolved solid pharmaceutical, regulated liquid waste, non-regulated liquid waste, and liquid radioactive medical waste 40.

313. The method of embodiment 312, wherein the liquid fluid comprises a liquid pharmaceutical or a liquid phase containing a dissolved solid pharmaceutical.

314. The method of any one of embodiments 298 to 313, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

315. The method of any one of embodiments 298 to 314, wherein the substrate 100 comprises from about 1.2 g to about 12.0 g of the activated carbon 11.

316. The method of any one of embodiments 298 to 315, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

317. The method of any one of embodiments 298 to 316, wherein the substrate 100 comprises from about 1.2 g to about 12.0 g of the superabsorbent particles 19.

318. The method of any one of embodiments 298 to 302, 304 to 309, 311 to 312, and 314 to 317, wherein the liquid fluid comprises liquid radioactive medical waste 40.

319. The method of any one of embodiments 298 to 302, 304 to 309, 311 to 312, and 314 to 318, wherein the liquid fluid comprises liquid radioactive medical waste 40 generated by radioisotope research, nuclear medicine, radiation oncology, and/or positron emission tomography (PET).

In addition, it should be understood that although the above-described waste disposal kits and methods are described as "comprising" one or more components or steps, the above-described waste disposal kits and methods may "comprise," "consists of," or "consist essentially of" the above-described components or steps of the waste disposal kits and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below. As used herein, the terms "comprises," "comprising," "includes," "including," "has," "having," "contains," "containing," "characterized by," or any other variation thereof, are intended to encompass a non-exclusive inclusion, subject to any limitation explicitly indicated otherwise, of the recited components. For example, a waste disposal kit and/or method that "comprises" a list of elements (e.g., components or steps) is not necessarily limited to only those elements (or components or steps), but may include other elements (or components or steps) not expressly listed or inherent to the waste disposal kit and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a waste disposal kit and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described waste disposal kits and/or methods may comprise, consist essentially of, or consist of any of the herein-described components and features, as shown in the figures with or without any feature(s) not shown in the figures. In other words, in some embodiments, the waste disposal kits of the present invention do not have any additional features other than those shown in the figures, and such additional features, not shown in the figures, are specifically excluded from the waste disposal kits. In other embodiments, the waste disposal kits of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Waste and/or sharps disposal kits similar to exemplary waste and/or sharps disposal kit 1000 shown in FIGS. 1-12 were prepared and utilized in a home environment, as well as a commercial environment (e.g., a pharmacy or a research lab or a medical/hospital setting). Each mixture within a given waste and/or sharps disposal kit had one of the following compositions:

Formulation 1:
Water—73.8 wt %
N-methylolacrylamide—26 wt %
Sodium Nitrite—0.1 wt %
Benzotriazole—0.1 wt %
Activated Carbon—0.1 to 3.0 wt %

Formulation 2:
Water—73.75 wt %
N-methylolacrylamide—26 wt %
Sodium Nitrite—0.1 wt %
Benzotriazole—0.1 wt %
Red Dye—0.05 wt %
Activated Carbon—0.1 to 3.0 wt %

Each kit also contained a separate package of polymerization initiator comprising either ammonium persulfate or zinc formaldehyde sulfoxylate.

Upon polymerization of the mixtures of Formulation 2, the mixture turns from a red color to a yellow color (i.e., a very pale yellow; could also be described as a colorless opaque solid).

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A waste disposal substrate comprising:
(a) at least one layer of fibers,
(b) at least one layer comprising activated carbon; and
(c) at least one layer comprising superabsorbent particles, wherein said waste disposal substrate further comprises liquid radioactive medical waste therein or thereon, wherein the waste disposal substrate comprises (a) two outermost nonwoven layers, (b) two nonwoven layers containing activated carbon adjacent to and between the two outermost nonwoven layers, (c) two layers containing a mixture of activated carbon and superabsorbent particles adjacent to and between the two nonwoven layers containing activated carbon, and (d) two interior nonwoven layers positioned between the two layers containing a mixture of activated carbon and superabsorbent particles.

2. The waste disposal substrate of claim 1, wherein the liquid radioactive medical waste is generated by radioisotope research, nuclear medicine, radiation oncology, or positron emission tomography (PET).

3. The waste disposal substrate of claim 1, wherein the waste disposal substrate comprises from two to eight nonwoven layers.

4. The waste disposal substrate of claim 3, wherein the waste disposal substrate comprises (i) at least one layer containing activated carbon in combination with fibers, and (ii) at least one layer containing activated carbon but no fibers.

5. The waste disposal substrate of claim 4, wherein at least one layer of the waste disposal substrate contains a mixture of activated carbon and superabsorbent particles.

6. The waste disposal substrate of claim 1, wherein the waste disposal substrate has an overall length ranging from about 3.0 inches (in) to about 48.0 in, an overall width ranging from about 1.0 in to about 48.0 in, and an overall thickness ranging from about 0.10 in to about 1.0 in.

7. The waste disposal substrate of claim 1, wherein the liquid radioactive medical waste is generated by radioisotope research.

8. The waste disposal substrate of claim 1, wherein the liquid radioactive medical waste is generated by nuclear medicine.

9. The waste disposal substrate of claim 1, wherein the liquid radioactive medical waste is generated by radiation oncology.

10. The waste disposal substrate of claim 1, wherein the liquid radioactive medical waste is generated by positron emission tomography (PET).

11. The waste disposal substrate of claim 1, wherein at least one layer of the waste disposal substrate contains a mixture of activated carbon and superabsorbent particles.

12. The waste disposal substrate of claim 1, wherein the waste disposal substrate comprises at least one layer containing activated carbon in combination with fibers.

13. The waste disposal substrate of claim 1, wherein the waste disposal substrate comprises at least one layer containing activated carbon but no fibers.

14. The waste disposal substrate of claim 1, wherein the waste disposal substrate comprises two outermost nonwoven layers.

15. The waste disposal substrate of claim 1, wherein the waste disposal substrate comprises two to eight fiber-containing layers.

16. The waste disposal substrate of claim 1, wherein the waste disposal substrate comprises:
two layers containing a mixture of activated carbon and superabsorbent particles; and
two nonwoven layers containing activated carbon, wherein,
the two layers containing a mixture of activated carbon and superabsorbent particles are adjacent to and between the two nonwoven layers containing activated carbon.

17. The waste disposal substrate of claim 1, wherein the waste disposal substrate has an overall length ranging from about 3.0 inches (in) to about 48.0 in.

18. The waste disposal substrate of claim 1, wherein the waste disposal substrate has an overall thickness ranging from about 0.10 in to about 1.0 in.

* * * * *